(12) United States Patent
Qi

(10) Patent No.: US 7,039,563 B2
(45) Date of Patent: May 2, 2006

(54) METHOD FOR SIMULATING AN OCULAR OPTICAL SYSTEM AND APPARATUS THEREFOR

(75) Inventor: Hua Qi, Tokyo (JP)

(73) Assignee: Hoya Corporation, Tokyo (JP)

( * ) Notice: Subject to any disclaimer, the term of this patent is extended or adjusted under 35 U.S.C. 154(b) by 1059 days.

(21) Appl. No.: 09/861,724

(22) Filed: May 22, 2001

(65) Prior Publication Data

US 2001/0056338 A1  Dec. 27, 2001

(30) Foreign Application Priority Data

May 22, 2000  (JP) ........................ 2000-150450

(51) Int. Cl.
*G06F 17/10* (2006.01)
*G06F 7/48* (2006.01)
*A61B 3/00* (2006.01)

(52) U.S. Cl. ............................ 703/2; 703/6; 351/200
(58) Field of Classification Search .................. 703/2, 703/6; 702/150, 151; 348/121; 351/169, 41, 351/200
See application file for complete search history.

(56) References Cited

U.S. PATENT DOCUMENTS

| 5,583,795 | A | * | 12/1996 | Smyth ..................... 702/150 |
| 5,726,916 | A | * | 3/1998 | Smyth ..................... 702/151 |
| 5,734,421 | A | * | 3/1998 | Maguire, Jr. .............. 348/121 |
| 6,181,371 | B1 | * | 1/2001 | Maguire, Jr. .............. 348/121 |
| 6,186,626 | B1 | * | 2/2001 | Francois et al. ........... 351/169 |

FOREIGN PATENT DOCUMENTS

| EP | 0 734 683 A2 | 10/1996 |
| EP | 0 950 887 A2 | 10/1999 |
| EP | 1 018 691 A1 | 7/2000 |

OTHER PUBLICATIONS

Dubois et al., Simulator for Laser Photocoagulation in Ophthalmology, IEEE Transactions on Biomedical Engineering, vol. 42, No. 7, Jul. 1995, pp. 688–693.*

Robert et al., An Image Filtering Process Based on Foveal Mechanism Simulation, Conference Record of the 31$^{st}$ asilomar Conference on Signals, Systems & Computers, vol. 2, Nov. 1997, pp. 1725–1729.*

Sanghoon et al., Foveated Video Image Analysis and Compression Gain Measurements, 4th IEEE Southwest Symposium on Image Analysis and Interpolation, Apr. 2000, pp. 63–67.*

Cha et al., Simulation of a Phosphene Field Based Visual Prosthesis, IEEE Int. Conference on Systems, Man and Cyberntics, Nov. 1990, pp. 921–923.*

European Search Report dated Feb. 17, 2003 for European Application No. EP 01 11 2284.

* cited by examiner

*Primary Examiner*—Russell Frejd
(74) *Attorney, Agent, or Firm*—Griffin & Szipl, P.C.

(57) ABSTRACT

A method and apparatus for simulating an ocular optical system that enables simulating visual perception having fluctuation, distortion and blur in the use of spectacle lenses such as progressive addition lenses. A binocular synkinetic rotation-based retinal image is created, defined as an image obtained by rotating both eyeballs toward each object point in a visual field, then, uniting images projected on the foveae of right and left eyes and to produce a united image. An original image is created wherein the midpoint of binocular rotation is placed at a specific position, and objects within a specific pyramidal visual field are observed. A distorted original image is obtained by observing the visual field through spectacle lenses using the ray tracing method. Point Spread Functions (PSF's) are derived, wherein right and left monocular PSF's are obtained and a united binocular PSF is derived from both monocular PSF's. Visual perception through spectacle lenses is simulated by convoluting of the distorted original image and the united binocular PSFs with respect to each pixel of the original image.

17 Claims, 13 Drawing Sheets

Processes within ⌐ ¬ are done for each image pixel

FIG.5

Optical Parameters of Navarro's Eye Model (Accommodation Free)

| Radius of Curvature (mm) | |
|---|---|
| Anterior surface of cornea | 7.72 |
| Posterior surface of cornea | 6.2 |
| Anterior surface of crystalline lens | 10.2 |
| Posterior surface of crystalline lens | -6.0 |
| Asphericity Q | |
| Anterior surface of cornea | -0.26 |
| Anterior surface of crystalline lens | -3.1316 |
| Posterior surface of crystalline lens | -1.0 |
| Thickness (mm) | |
| Cornea | 0.55 |
| Aqueous | 3.05 |
| Crystalline lens | 4.0 |
| Vitreous | 16.4 |
| Refractive index | |
| Cornea | 1.367 |
| Aqueous | 1.3374 |
| Crystalline lens | 1.42 |
| Vitreous | 1.336 |
| Resulting refractive power (diopters) | 60.4 |

FIG.6

Dependence of Lens Parameters on Accommodation A (in diopters)

| Lens Parameter | Accommodation depence |
|---|---|
| Anterior Crystalline Lens Radius | $R_3(A) = 10.2000 - 1.7500 \ln(A+1)$ |
| Anterior Crystalline Lens Asphericity | $Q_3(A) = -3.1316 + 0.3400 \ln(A+1)$ |
| Posterior Crystalline Lens Radius | $R_4(A) = -6.0000 + 0.2294 \ln(A+1)$ |
| Posterior Crystalline Lens Asphericity | $Q_4(A) = -1.0000 - 0.1230 \ln(A+1)$ |
| Aqueous Thickness | $D_2(A) = 3.0500 - 0.0500 \ln(A+1)$ |
| Crystalline Lens Thickness | $D_3(A) = 4.0000 + 0.1000 \ln(A+1)$ |
| Crystalline Lens Refractive Index | $n_3(A) = 1.4200 + 9.00 \times 10^{-5}(10.00A + A^2)$ |

FIG.7
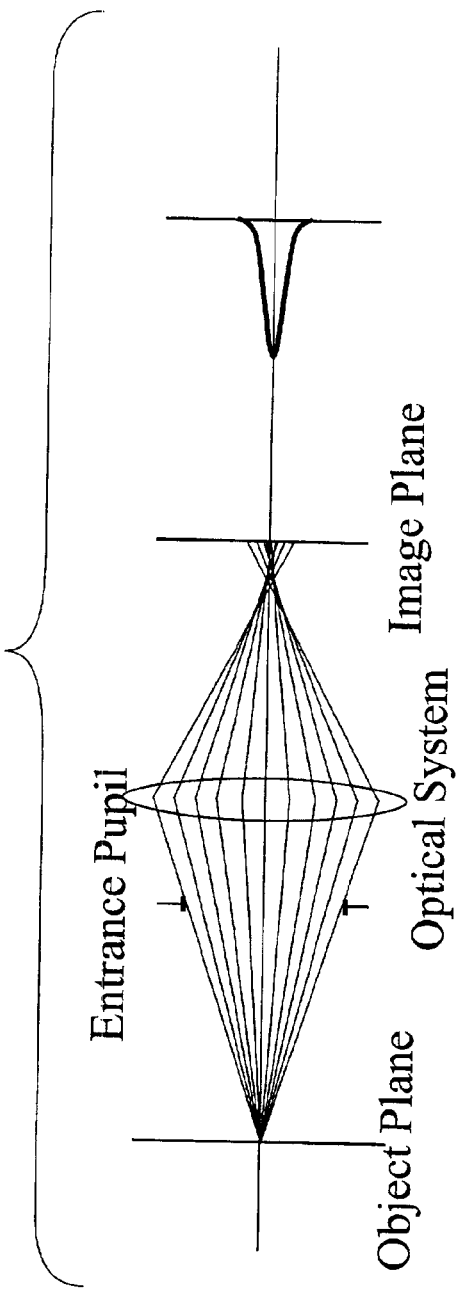
Entrance Pupil · Optical System · Object Plane · Image Plane
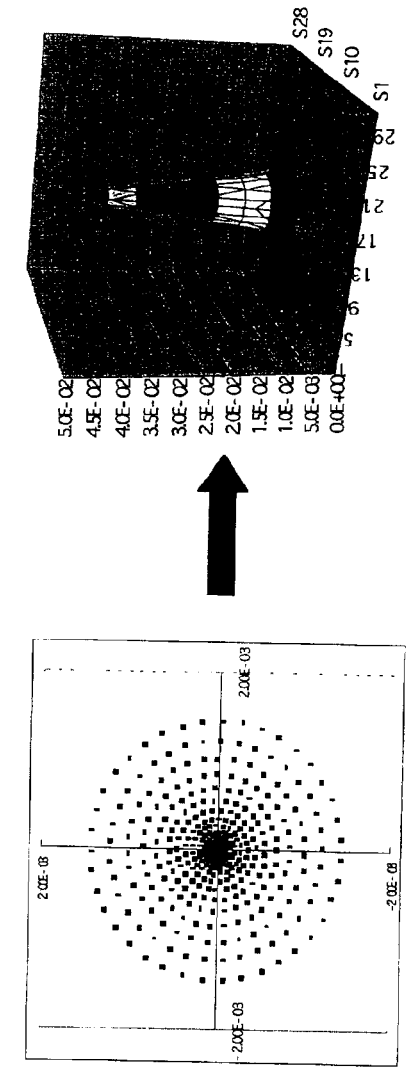
Spot Diagram
PSF

METHOD FOR SIMULATING AN OCULAR OPTICAL SYSTEM AND APPARATUS THEREFOR

FIELD OF THE INVENTION

The present invention relates to a method for simulating an ocular optical system in accordance with which a scene of external things actually seen by an observer through two spectacle lenses each placed in front of right and left eyes is simulated, and to an apparatus therefor.

BACKGROUND OF THE INVENTION

A method for simulating an ocular optical system in accordance with which a scene of external things actually seen by an observer through spectacle lenses placed in front of each of right and left eyes is simulated and an apparatus therefor have been disclosed by the present inventor in Japanese Patent Application No. Heisei 10(1998)-288077.

In the method and the apparatus described above, a scene of external things actually seen by an observer through a lens placed in front of a single eye is simulated. In accordance with the above method and by using the above apparatus, the actual human perception can be taken into consideration and the visual perception including fluctuation, distortion and blur felt in the use of optical spectacle lenses such as progressive addition lenses can be closely simulated.

Since a person observes things with both eyes, the simulation of visual perception with a single eye is not always sufficient for the purpose of expressing and evaluating the visual perception of external thing observed through spectacle glasses. Generally on a progressive addition lens, the area for viewing objects of close distance is placed at a position displaced a little bit nasally for the consideration of convergence. Therefore, the shape of the lenses becomes asymmetric in the horizontal direction to some degree. This, by itself, is not a defect but a great progress of the progressive addition lenses. However, in a monocular rotation-based retinal image, the asymmetry in the horizontal direction is faithfully reproduced and the image has distortion different from that in the actually perceived image.

To remove the distortion of the asymmetry in the horizontal direction and simulate the proper human perception, it is necessary to take the function of binocular vision into the simulation. Thus, defining and calculating distortion and blur arising from the function of binocular vision has been the subject of study. In accordance with specific assumptions and methods found by the present inventor, the visual perception obtained by binocular vision can be approximately simulated using image-processing technology.

The present invention has been made under the above circumstances and has a purpose of providing a method for simulating an ocular optical system which enables simulating visual perception having fluctuation, distortion and blur including the function of binocular vision in the use of spectacle lenses such as progressive addition lenses.

SUMMARY OF THE INVENTION

In accordance with the above objects, there is provided a method for simulating an ocular optical system comprising simulating objects as seen by an observer through spectacle lenses placed in front of right and left eyes, the method comprising the steps of: creating a binocular foveal image with respect to a plurality of object points in a visual field by computer simulation, wherein the binocular foveal image is an image produced by uniting images projected on each fovea of the right and left retinas of the right and left eyes when each of the right and left eyes is rotated in a manner such that an object point in the visual field is caught at the fovea of each of the right and left retinas; and simulating the perception of object points in the visual field as actually seen by an observer through spectacle lenses placed in front of each of the right and left eyes using the binocular foveal image.

In accordance with a further embodiment of the present invention, there is provided a method for simulating an ocular optical system comprising simulating objects as seen by an observer through spectacle lenses placed in front of right and left eyes. The method comprising the steps of: creating a binocular synkinetic rotation-based retinal image by computer simulation; and simulating the perception of object points in the visual field as actually seen by an observer through spectacle lenses placed in front of each of the right and left eyes using the binocular synkinetic rotation-based retinal image.

The method of the present invention preferably further comprises the step of displaying the binocular foveal image or binocular synkinetic rotation-based retinal image on a display apparatus.

In a still further embodiment of the present invention the step of creating a binocular synkinetic rotation-based retinal image further comprises additional steps. One additional step is creating an original image comprising placing a midpoint of binocular rotation at a specific position, the midpoint of binocular rotation being a midpoint between centers of monocular rotation of right and left eyes, and creating, as the original image, an image within a visual field defined as a specific pyramidal field having an apex at the midpoint of binocular rotation. Another additional step is creating a distorted original image by a ray tracing method, wherein the distorted original image is an image having distortion obtained by observing object points in the visual field through the spectacle lenses. A further additional step is deriving point spread functions, comprising providing left and right composite optical systems each comprising a spectacle lens and an ocular optical system, obtaining right and left monocular point spread functions from light emitted from each object point, and deriving a binocular point spread function by uniting the right and left monocular point spread functions. A still further additional step is convoluting the distorted original image created in the step of creating a distorted original image and the binocular point spread functions derived in the step of point spread functions with respect to each object point of the original image.

In a yet further embodiment, there is provided a method comprising the steps (a) through (e).

The step of (a) creating an original image, further comprises the steps of: (i) creating virtual objects by using computer graphics and placing the virtual objects in a virtual three-dimensional space; (ii) placing a midpoint of binocular rotation at a specific position in the virtual three-dimensional space; (iii) creating an original image of the virtual objects within a visual field, the visual field defined as a pyramid whose apex is located at the midpoint of binocular rotation and whose central axis is along a direction of a specific central visual line; and (iv) obtaining, with respect to a plurality of object points, each object point corresponding to a pixel of the original image, an object distance, the object distance being defined as a distance between the object point and the midpoint of binocular rotation.

The step of (b) creating a distorted original image, preferably further comprises the steps of: (i) defining, for viewing an object point, a direction of synkinetic binocular rotation, which is uniquely determined, by both directions of rotation of right and left eyeballs toward the object point; (ii) obtaining a central direction of synkinetic binocular rotation with a ray tracing method so that each of right and left monocular central principal rays passe through a specific position on each spectacle lens, respectively, wherein the central direction of synkinetic binocular rotation is the direction of synkinetic binocular rotation for viewing the object point located at a center of the visual field and the right and left monocular central principal rays are principal rays directed from right and left eyeballs, respectively, toward the central object point; (iii) obtaining, with respect to each object point, a direction of synkinetic binocular rotation for viewing the object point as the position of the object point in an after-lens visual field with a ray tracing method, wherein the after-lens visual field is a visual field whose central axis is along the central direction of synkinetic binocular rotation; (iv) creating a distorted original image, the distorted original image being defined as an image obtained in the after-lens visual field and having distortion caused by the spectacle lenses; and (v) obtaining, with respect to each object point, both right and left principal ray-passing positions, wherein the principal ray-passing position is a position on the spectacle lens through which a principal ray toward the object point passes.

The step of (c) comprises obtaining positions of spectacle frames by creating images of spectacle frame marks that indicate positions of right and left spectacle frames on the original image or on the distorted original image by using data of the principal ray-passing positions obtained in the step of creating a distorted original image.

The step of (d) deriving point spread functions, preferably further comprises the steps of: (i) providing an accommodation-dependent ocular optical system for each of the right and left eyes as a model of the ocular optical system; (ii) calculating, with respect to each object point, distances from the object point to the right and left centers of monocular rotation using the object distance obtained in the step of creating an original image; (iii) setting, with respect to each object point, powers of accommodation of right and left eyes to a same value or different values in accordance with each distance from the object point to each center of monocular rotation, and each refractive power of spectacle lens at each principal ray-passing position obtained in the step of creating a distorted original image; (iv) deriving, with respect to each object point, a monocular point spread function for each of the right and left eyes in a composite optical system comprising the spectacle lens and the accommodation-dependent ocular optical system which is rotated in accordance with a direction of monocular rotation; and (v) deriving, with respect to each object point, a binocular point spread function by uniting both right and left monocular point spread functions obtained in step (c) (iv).

The step of (e) convoluting, which preferably further comprises the steps of: (i) convoluting the distorted original image and the binocular point spread functions of each object point to create a binocular synkinetic rotation-based retinal image; and (ii) where necessary, overlaying images of both right and left spectacle frame marks created in the step of obtaining positions of spectacle frames on the binocular synkinetic rotation-based retinal image.

In a still further preferred embodiment, there is provided a method for simulating an ocular optical system comprising simulating objects as actually seen by an observer through spectacle lenses placed in front of right and left eyes comprising the steps of: creating virtual objects by using computer graphics and placing them in a virtual three-dimensional space; creating a story, of for a plurality of points in time, of a position of a midpoint of binocular rotation, direction of the central visual line, principal ray-passing positions on each spectacle lens, an amount of deformation and displacement of the virtual objects; creating a binocular synkinetic rotation-based retinal image at each point of time using the method for simulating an ocular optical system according to the present invention; and creating a video image of the binocular synkinetic rotation-based retinal image by editing the binocular synkinetic rotation-based retinal images for said plurality of points in time.

According to the present invention, the direction of synkinetic binocular rotation preferably satisfies following principles:

a single unique direction of synkinetic binocular rotation is determined by directions of right and left monocular rotations;

the direction of synkinetic binocular rotation continuously changes with changes in directions of right and left monocular rotation; and the direction of synkinetic binocular rotation approximates the direction of right and left monocular rotation.

In the step of creating a distorted original image, the direction of synkinetic binocular rotation is preferably defined as follows:

Formula 1:

$$\bar{r} = \frac{k\bar{r}_R + (1-k)\bar{r}_L}{|k\bar{r}_R + (1-k)\bar{r}_L|}$$

wherein $\bar{r}$ represents a unit vector in the direction of synkinetic binocular rotation, $\bar{r}_R$ and $\bar{r}_L$ represent unit vectors in the directions of right and left monocular rotations, respectively, in Descartes coordinates and $0<k<1$.

According to the method of the present invention, in the step of deriving point spread functions, a binocular point spread function is preferably derived by uniting both right and left monocular point spread functions for viewing an object point representing each pixel in the original image in accordance with following principles:

when the monocular point spread function for the right eye and the monocular point spread function for the left eye are close to each other, the united point spread function is of a distribution more concentrated than each monocular point spread function;

when the monocular point spread function for the right eye and the monocular point spread function for the left eye are different from each other beyond a certain degree, the united point spread function is a distribution close to the most concentrated distribution of the monocular point spread functions; and continuity and uniqueness of the united point spread functions are maintained.

Also according to the present invention, preferably, in the step of deriving the point spread functions, both right and left monocular point spread functions for viewing an object point are derived using a same method; each derived monocular point spread function is optimally approximated with a two-dimensional normal distribution function using a same method; and parameters of a two-dimensional normal distribution function approximating the binocular point spread function made by uniting both monocular point spread functions are obtained from parameters of the two-dimensional normal distribution functions approximating the both right and left monocular point spread functions according to the method:

In polar coordinates, when the monocular PSF for the right eye is expressed as:
Formula 2:

$$p_R(r, \theta) = \frac{\sqrt{A_R^2 - B_R^2}}{2\pi} \exp\left(-\frac{r^2}{2}(A_R - B_R\cos(2\theta - 2\alpha_R))\right)$$

and the monocular PSF for the left eye is expressed as:

$$p_L(r, \theta) = \frac{\sqrt{A_L^2 - B_L^2}}{2\pi} \exp\left(-\frac{r^2}{2}(A_L - B_L\cos(2\theta - 2\alpha_L))\right),$$

then the binocular PSF united by both monocular PSFs is expressed as:

$$p(r, \theta) = \frac{\sqrt{A^2 - B^2}}{2\pi} \exp\left(-\frac{r^2}{2}(A - B\cos(2\theta - 2\alpha))\right),$$

where parameters A,B,α of the united binocular PSF are expressed as:

$$A = \kappa(A_R + A_L)$$

$$B = \kappa\sqrt{B_R^2 + B_L^2 + 2B_R B_L \cos 2(\alpha_R - \alpha_L)}$$

$$\tan 2\alpha = \frac{B_R \sin 2\alpha_R + B_L \sin 2\alpha_L}{B_R \cos 2\alpha_R + B_L \cos 2\alpha_L},$$

wherein κ is expressed as:

$$\kappa = \frac{2S_C}{S_R + S_L},$$

wherein $S_R$ is the area of the ellipse $$r^2(A_R - B_R \cos(2\theta - 2\alpha_R)) = 1$$

which represents the distributive area of right monocular PSF and $S_L$ is the area the ellipse $$r^2(A_L - B_L \cos(2\theta - 2\alpha_L)) = 1$$

which represents the distributive area of left monocular PSF and $S_C$ is the area of the common portion of the both ellipses and κ is the ratio of $S_C$ to the average area $$\frac{S_R + S_L}{2}.$$

Also in accordance with the above objects there is provided an apparatus for simulating an ocular optical system comprising simulating objects as seen by an observer through spectacle lenses placed in front of right and left eyes, comprising means for carrying out the process steps of the method described above.

Further objects, features and advantages of the present invention will become apparent from the Detailed Description of the Preferred Embodiments, which follows, when considered together with the attached figures.

BRIEF DESCRIPTION OF THE DRAWINGS

FIG. 5 shows a table listing ocular optical parameters of the Navarro model in a state without accommodation.

FIG. 6 is a table listing equations for ocular optical parameters of the Navarro model as functions of the power of accommodation.

FIG. 7 generation of a Point Spread Function (PSF).

Figure 1:
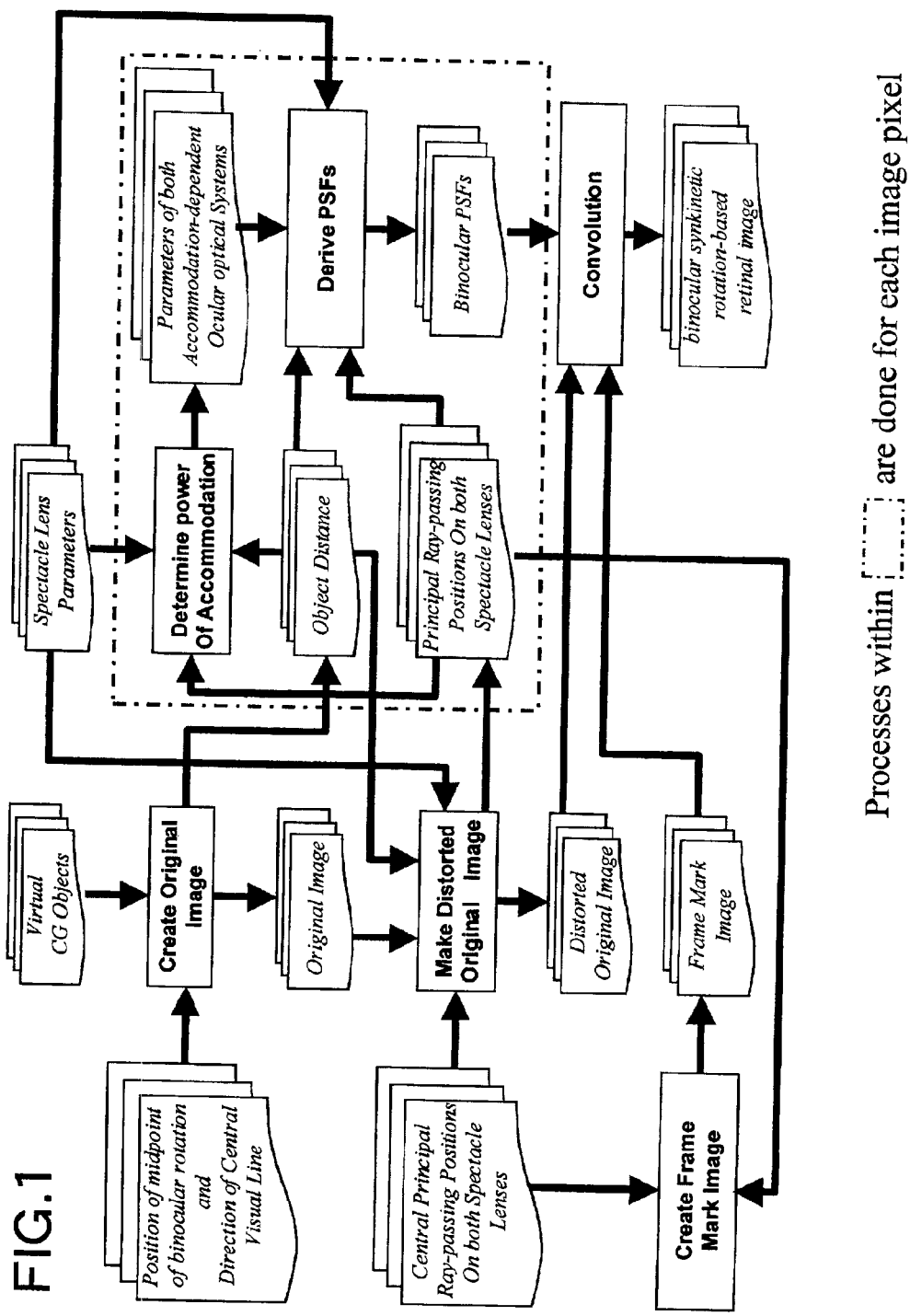
FIG. 1 is a flow diagram of the method of creating a binocular synkinetic rotation-based retinal image and simulating an ocular optical system according to the present invention.

DETAILED DESCRIPTION OF THE PREFERRED EMBODIMENTS (A) Embodiment 1

The method for simulating an ocular optical system of Embodiment 1 of the present invention will be described as follows with reference to the above-described Figures.

The method for simulating an ocular optical system of the present embodiment is a method for creating a still image of a binocular synkinetic rotation-based retinal image when three-dimensional virtual objects created by computer graphics are observed through a pair of spectacle lenses placed in front of the right and left eyes, respectively. The binocular synkinetic rotation-based retinal image is an image which is created, based on specific assumptions found by the present inventor, by treating the above image of three-dimensional virtual objects with optical effects taken into consideration using image processing technology in order to approximately reproduce the image as perceived by the eyes. In other words, the binocular synkinetic rotation-based retinal image is not an optical image projected on the retinal surfaces of eyes but an image defined as an image created as follows: for each of a plurality of object points in a visual field, right and left eyeballs are rotated in a manner such that the object point is caught at the fovea on the retina of each eyeball and a united image of the object point is created by uniting both images each projected on the right and left foveae; and then the binocular synkinetic rotation-based retinal image is created by connecting these united images for the plurality of object points. The method for simulating an ocular optical system used in Embodiment 1 comprises (1) creating an original image, (2) creating a distorted original image, (3) obtaining positions of spectacle frames, (4) obtaining a Point Spread Function (PSF) and (5) convolution.

(1) Creating an Original Image

This step comprises creating virtual objects by using computer graphics and placing the objects in a virtual three-dimensional space; placing a midpoint of binocular rotation at a specific position in the virtual three-dimensional space; creating, as the original image, an image of the virtual objects within a visual field defined as a specific range of a pyramid whose apex is located at the midpoint of binocular rotation and whose central axis is along a direction of a specific central visual line; and obtaining, with respect to each of a plurality of object points, each object point corresponding to a pixel of the original image, an object distance defined as a distance between the object point and the midpoint of binocular rotation. This step will be described in more detail as follows.

a. Creating Virtual Objects for the Original Image

In accordance with a well-known method of computer graphics, virtual objects are created and placed in a virtual three-dimensional space. For example, a disk, a chair and other furniture may be placed in a virtual room; or, as a further example, a flowerbed, trees and traffic signs may be placed in a virtual outdoor field.

b. Creation of an Original Image

Figure 2:
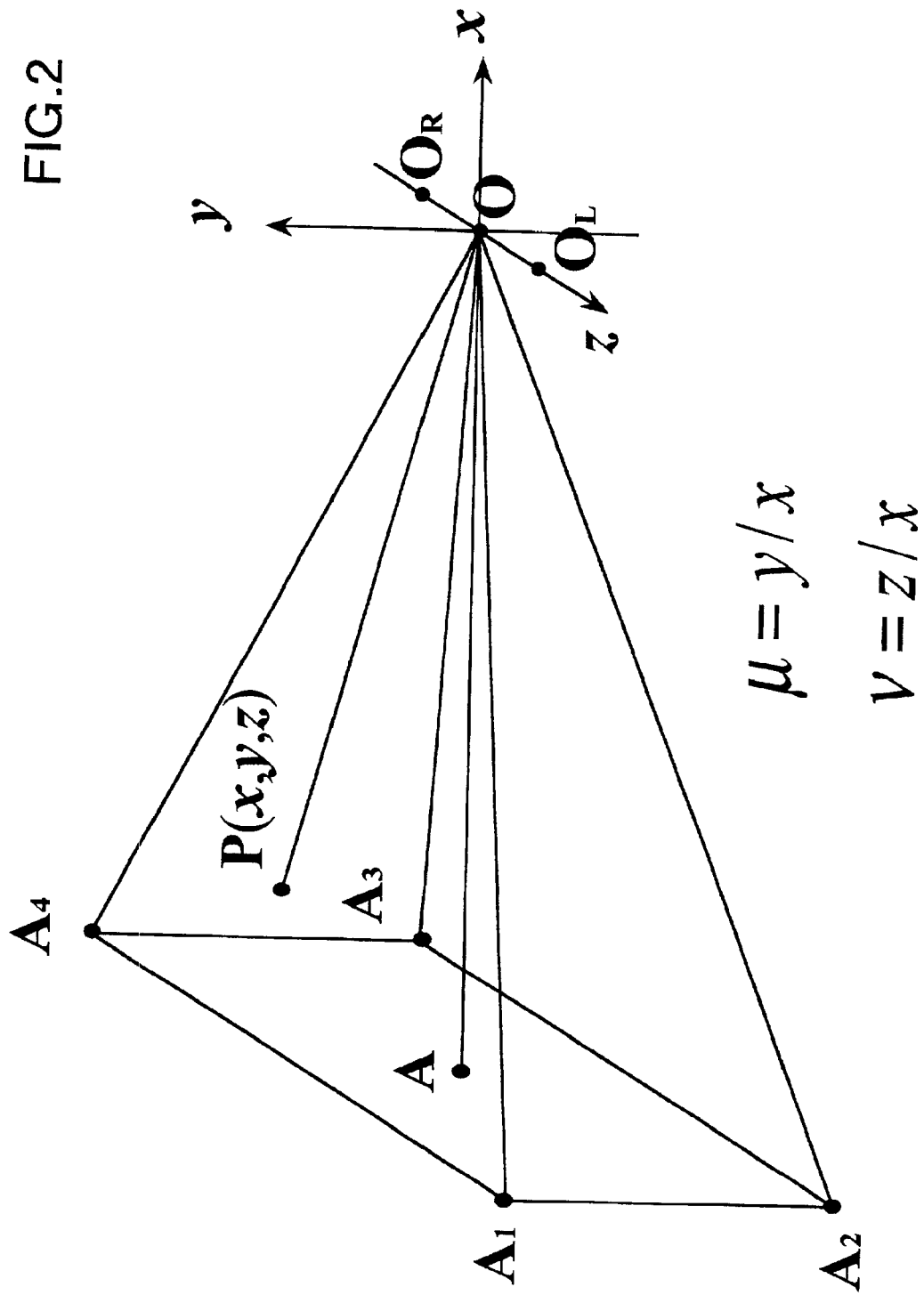
FIG. 2 is a diagram showing the coordinate system of the visual field of an original image according to the present invention.

The midpoint of binocular rotation, defined as the midpoint of both centers of monocular rotation, is placed at a specific position in the virtual three-dimensional space. Thereafter, an original image is created as an image of the virtual objects created above within a visual field. The visual field is defined as a specific range defined by pyramid whose apex is located at the midpoint of binocular rotation and whose central axis is along a direction of a specific central visual line. More specifically, as shown in FIG. 2, a visual field is defined as a pyramid $A_1A_2A_3A_4$ whose apex is located at O, the midpoint of centers of right monocular rotation $O_R$ and left monocular rotation $O_L$, and whose central axis is along the direction of the central visual line OA which is perpendicular to the line $O_RO_L$. An image is created within this visual field and defined to be the original image. In the pyramidal visual field, the position of an arbitrary point P(x,y,z) on the original image is expressed by coordinates $\mu=y/x$ and $\nu=z/x$ wherein (x,y,z) are the coordinates of the point within a Cartesian coordinate system whose point of origin is located at O and whose x-axis is along the line AO. When each object point in the visual field is projected in this manner, any straight line in the space is always projected as a straight line on the image. Therefore, the projection is of no distortion. An image created by projecting every object point in accordance with this projection is used as the original image.

c. Obtaining an Object Distance to an Object Point

In the step of creating an original image, the distance between the object point P(x,y,z) and the midpoint of binocular rotation O, i.e., the object distance, is also obtained from the values of the coordinates.

(2) Creating a Distorted Original Image

In this step, an image, having distortion caused by the spectacle lenses when the original visual field is observed through spectacle lenses, is created, and positions are noted on each spectacle lenses through which each of the object points is observed. The position of an object point observed by both eyes is expressed by the direction of synkinetic binocular rotation. The definition of the direction of synkinetic binocular rotation is the key determining the perception of binocular vision. In accordance with the study by the present inventor, the definition of the direction of synkinetic binocular rotation should satisfy the following principles:

1. A single unique direction of synkinetic binocular rotation is determined by the directions of right and left monocular rotation;

2. The direction of synkinetic binocular rotation continuously changes with changes in the direction of right and left monocular rotation; and 3. Perception of space based on the direction of synkinetic binocular rotation approximates the perception of space based on the direction of both right and left monocular rotation.

Figure 3:
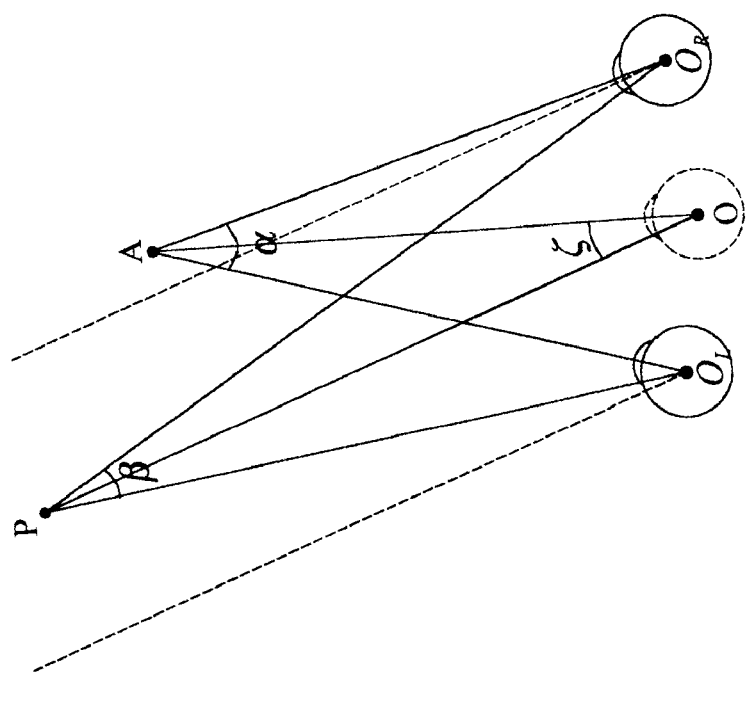
FIG. 3 is a diagram showing synkinetic binocular rotation according to the present invention.

One method of defining the direction of synkinetic binocular rotation is the method using the Hering's law. In 1868, Hering proposed Hering's law, which states that, the right eye and the left eye always rotate by the same amount, either in the same direction or in opposite directions. The rotation of both eyes for seeing an arbitrary point in space can be decomposed into two terms, i.e., the version and the vergence. As shown in FIG. 3, rotation of each of right and left eyes to see a point P can be decomposed into the version, the rotation of the eyes in the same direction by the same amount, and the vergence, the rotation of the eyes in opposite directions by the same angle of β/2, in a visual plane containing both centers of monocular rotation and the point P. The direction of the version is defined as the direction of synkinetic binocular rotation, i.e., the direction along the line which equally divides the angle between the directions of right and left monocular rotations.

When the unit vectors in the directions of right and left monocular rotations are expressed by:

$$\bar{r}_R \text{ and } \bar{r}_L \qquad \text{Formula 5:}$$

the unit vector in the direction of synkinetic binocular rotation may be expressed as:

Formula 6:

$$\bar{r} = \frac{\bar{r}_R + \bar{r}_L}{|\bar{r}_R + \bar{r}_L|}$$

In the Hering's law, the right eye and the left eye are assumed to be completely equal. However, in actuality, a phenomenon of a dominant eye, wherein one eye plays a dominant role compared with the other eye, is observable, although the degree may be different. Therefore, a coefficient k is introduced in the present invention and the unit vector in the direction of synkinetic binocular rotation is defines as:

Formula 7:

$$\bar{r} = \frac{k\bar{r}_R + (1-k)\bar{r}_L}{|k\bar{r}_R + (1-k)\bar{r}_L|}$$

wherein 0<k<1.

The direction of synkinetic binocular rotation for seeing an object point through spectacle lenses is affected by the effect of refraction of the spectacle lenses. A monocular principal ray is defined as the ray emitted from an object point and going through a spectacle lens toward a center of monocular rotation. A direction of monocular rotation is defined as the direction of the principal ray after leaving the rear surface of the spectacle lens since this is the direction the eyeball points to see the object point. The direction of synkinetic binocular rotation can be obtained from the directions of both right and left monocular rotation. A monocular central principal ray is defined as the principal ray emitted from the object point at the center of the visual field. A central direction of monocular rotation is defined as the direction of monocular rotation along the direction of the central principal ray. A central direction of synkinetic binocular rotation is defined as the direction of synkinetic binocular rotation obtained from the right and left central directions of monocular direction.

A distorted original image is an image expressed by positions of object points, each object point corresponding to a pixel of the original image, in an after-lens visual field. The after-lens visual field is the visual field having its central axis along the central direction of synkinetic binocular rotation. The central direction of synkinetic binocular rotation can be determined in accordance with the ray tracing method so that the right and left central principal rays pass the right and left spectacle lenses, respectively, at predetermined positions. The position of each object point in the after-lens visual field can be expressed by the direction of synkinetic binocular rotation for viewing the object point relative to the central direction of synkinetic binocular rotation. The right and left principal rays and the positions of the right and left principal rays on each spectacle lens with respect to each object point can be obtained in accordance with the ray tracing method.

Figure 4:
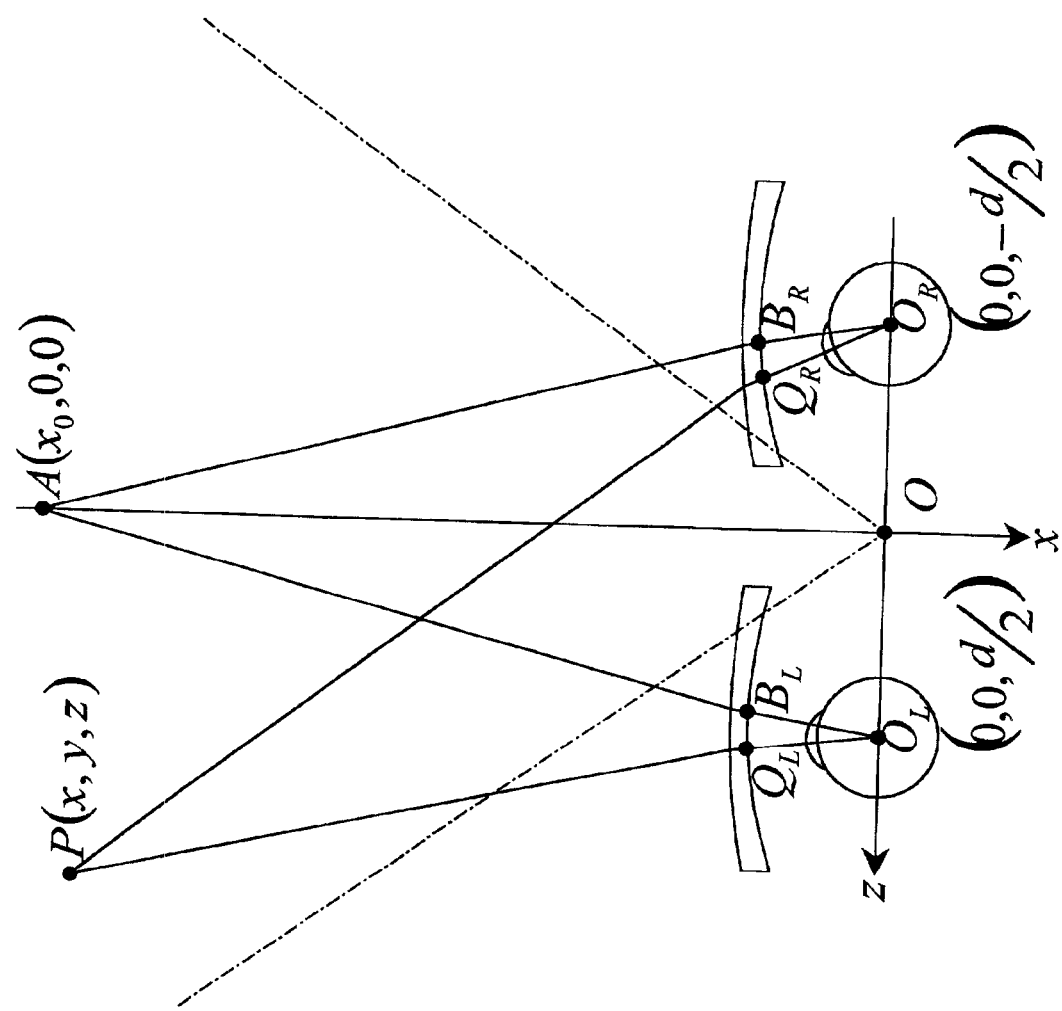
FIG. 4 is a diagram showing the coordinate system for obtaining the direction of synkinetic binocular rotation through spectacle lenses according to the present invention.

As shown in FIG. 4, when spectacle lenses are placed between the central object point $A(x_0, 0, 0)$ in the visual field and the right and left centers of monocular rotation $O_R(0, 0, -d/2)$ and $O_L(0, 0, d/2)$, respectively, it is necessary, in order to see the central object A, that the right eyeball be rotated not in the direction of $O_R A$ but in the direction $O_R B_R$, i.e., toward the position of the right ray on the right spectacle lens. Furthermore, it is necessary that the left eyeball be rotated not in the direction of $O_L A$ but in the direction $O_L B_L$, i.e., toward the position of the left ray on the left lens. The rays $AB_R O_R$ and $AB_L O_L$ are the right and left central monocular principal rays, respectively. The vectors $B_R O_R$ and $B_L O_L$ show the right and left central directions of monocular rotation, respectively. The positions of the right and left central monocular principal rays on the respective spectacle lenses, i.e., the principal ray-passing positions $B_R$ and $B_L$ are not independently set but are affected by the distance d between the centers of monocular rotation and the distance to the object point.

In accordance with the formula defining the direction of synkinetic binocular rotation described above, the direction of synkinetic binocular rotation $$\bar{r}$$ Formula 9:

can be obtained from the unit vectors in the directions of $B_R O_R$ and $B_L O_L$ $$\bar{r}_R \text{ and } \bar{r}_L$$ Formula 8:

respectively. The visual field having the central axis (the x' axis) along $$\bar{r}$$ Formula 10:

is referred to as the after-lens visual field.

The direction of synkinetic binocular rotation for seeing an arbitrary point $P(x,y,z)$ in the visual field can be obtained in the same manner. When the unit vector in the direction of synkinetic binocular rotation for seeing the point P in the coordinate system of the after-lens visual field is expressed as:

$$\bar{r}' = x'\bar{i} + y'\bar{j} + z'\bar{k}$$ Formula 11:

the coordinates of the point P in the image in the after-lens visual field are $\mu'=y'/x'$ and $v'=z'/x'$. When each object point in the visual field is projected in the after-lens visual field as an image, in general, a straight line in space is not projected as a straight line in the resultant image. Instead, an image having distortion caused by the lens is obtained. The image in the after-lens visual field created as described above is referred to as the distorted original image.

In the step of creating a distorted original image, principal ray-passing positions on both spectacle lenses are also obtained with respect to each of the object points. Although the ray tracing calculation must be carried out with respect to all object points within the visual field to find their directions of synkinetic binocular rotation and principal ray-passing positions on both spectacle lenses, it is possible to obtain these data with less calculation while controlling the calculation errors within a certain range by using a mathematical method called spline interpolation.

(3) Obtaining the Positions of Spectacle Frames

In this step, using the data of principal ray-passing positions on each spectacle lens obtained in the step of creating a distorted original image, the positions of edges and hidden marks of right and left spectacle frames on the distorted original image are obtained and images of the spectacle frame marks are created. By comparing the image of spectacle frame marks with the distorted original image, the positions on the right and left spectacle lenses through which each of the object points in the image are observed can be precisely found.

(4) Obtaining the PSF

In this step, an accommodation-dependent ocular optical system is introduced for each of the right and left eyes. With respect to each of the object points, each of which corresponds to a pixel of the original image, both distances from the object point to the right and left centers of monocular rotation are obtained from the objective distance obtained in the original image creating step. Thereafter, powers of accommodation of right and left ocular optical system are set to have the same value or different values in accordance with each distance from the object point to each center of monocular rotation, and each refractive power of the spectacle lenses at each principal ray-passing position obtained in the distorted original image creating step. A monocular PSF is obtained for each of the right and left eyes in a composed optical system comprising the spectacle lens and the accommodation-dependent ocular optical system, which is rotated in accordance with the direction of monocular rotation. PSF is a function that represents the distribution of luminance on the retina of the accommodation-dependent ocular optical system caused by the light emitted from the object point. Thereafter, a binocular PSF is obtained by uniting both monocular PSFs obtained as above. This step will be described more specifically as follows.

a. Introduction of Accommodation-dependent Ocular Optical System

To obtain the PSF on the retina, the introduction of an ocular optical system is necessary. The eye has the function of accommodation in accordance with the distance to an object and this function should be taken into consideration. In the present embodiment, the accommodation-dependent ocular optical system reported by R. Navarro et al is used. In the Navarro model, not only the paraxial value but also the spherical aberration and the chromatic aberration are adjusted to the actually-measured values of an eye. The model has a simple four-surface structure and three surfaces among the four surfaces are aspheric axially symmetrical quadratic surfaces. Since the crystalline lens does not have a gradient index, the tracing calculation can be conducted easily. The radius of curvatures, the thickness and the degrees of asphericity change in proportion to the logarithm of the power of accommodation. FIG. 5 shows a table listing ocular optical parameters of the Navarro model in the state without accommodation. FIG. 6 shows a table listing accommodation dependencies of ocular optical parameters. The aspherical surface is expressed as $y^2+z^2+(1+Q)x^2-2rX=0$, wherein Q represents the degree of asphericity.

b. Determination of the Power of Accommodation

When a person observes an object placed at a close distance, accommodation takes place. The power of accommodation is expressed by the inverse of the distance to the object. For example, the power of accommodation for observing an object at the distance of 1 meter is 1 diopter. When a progressive addition lens is used, the accommodation is performed partially by the progressive addition lens and the accommodational load of the eye can be eased. Therefore, the power of accommodation in the use of a progressive addition lenses depends not only on the distance to the object but also on the refractive power of the lens at the position at which the ray passes. Moreover, since a person wearing a progressive addition lens is usually presbyopic, i.e., his ability of accommodation has been decreased; a power of accommodation exceeding the maximum value cannot be reached. Therefore, when a power of accommodation exceeding the maximum value is required, the power of accommodation is fixed at the maximum value of the eye. In this case, the image is blurred. When an object is observed by both eyes, the power of accommodation required for each of the right and left eyes may be occasionally different depending on the difference in the distance to the object and the position of the lens at which the ray passes. However, in accordance with the ocular physiology, different accommodations cannot be performed for the right eye and the left eye. Therefore, in this case, it is necessary that the same optimum power of accommodation be set for both eyes.

c. Deriving a Monocular PSF i. Meaning of PSF

As shown in FIG. 7, PSF is the function showing the concentration of a cluster of spots on the image plane of rays, which are emitted, from an object point. The function can be expressed as the distribution of the density of spots. In a perfect optical system, all spots are concentrated at the image point and the distribution of PSF becomes a straight line perpendicular to the image plane. However, in general, the distribution has a broader shape similar to a Gaussian distribution.

ii. Method for Deriving PSF

Figure 8:
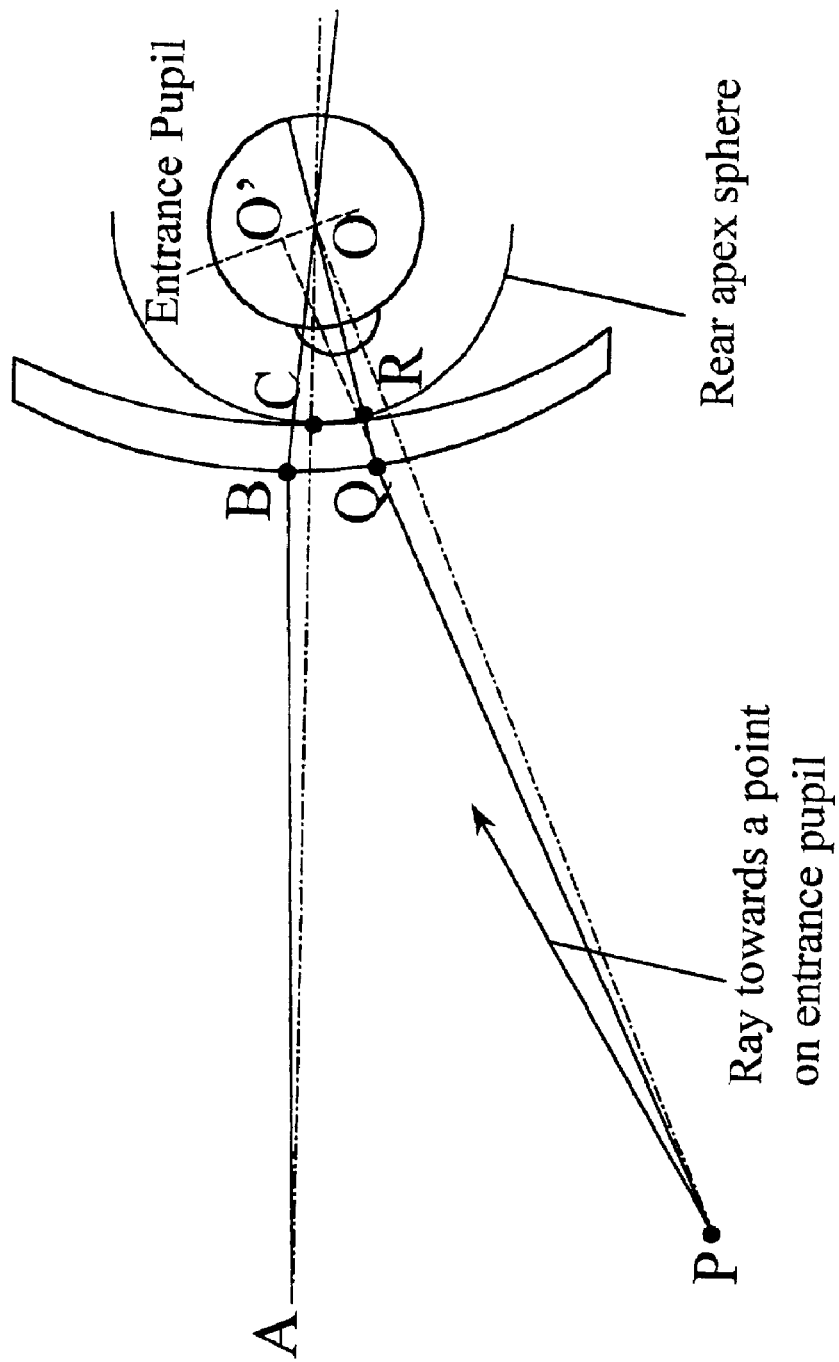
FIG. 8 shows an ocular optical system including a spectacle lens when an object is observed.

FIG. 8 shows the composite optical system for obtaining the PSF when a point P is seen through a position Q on a spectacle lens. The ray emitted from the object point P is refracted at the point Q on the surface of the lens. The ray changes its direction at Q towards the center of monocular rotation O. To the eye, the object point P is seen as if the object point were located on the extension of the direction QO. As described above, when the point P is seen, the optical axis of the eyeball is rotated in the direction QO and the power of accommodation is set in accordance with the distance to the object point P and the refractive power at the point Q. The accommodation is performed based on the result. When the accommodation has been completed, the optical system is fixed and PSF can be derived.

As described above, PSF is the density of spots on the image plane of rays, which are emitted from an object point, pass through each of many points equally distributed on the entrance pupil. The entrance pupil, exactly, is located at the conjugative position of the iris pupil in the object side. However, the iris pupil changes its position while the eye is rotated, also its conjugative position in the object side moves dependent on the accommodation. On the other hand, the center of monocular rotation is placed at a fixed position and the distance to the conjugative point of the iris pupil is much smaller than the distance to the object point. Therefore, when no spectacle lens is placed in front of an eye, it causes no problems to assume that the entrance pupil is located at the center of monocular rotation. When a spectacle lens is placed in front of the eye, the entrance pupil of the entire optical system should be located at the conjugative point of the center of monocular rotation via the spectacle lens. However, the position varies delicately when a progressive addition lens is used since the power is different depending upon the position of the lens at which the ray passes. Since the amount of the variation is much smaller than the distance to the object point, it can be assumed that the position of the entrance pupil is located at a point O' on the extension of the line PQ which satisfies PO=PO'.

Figure 9:
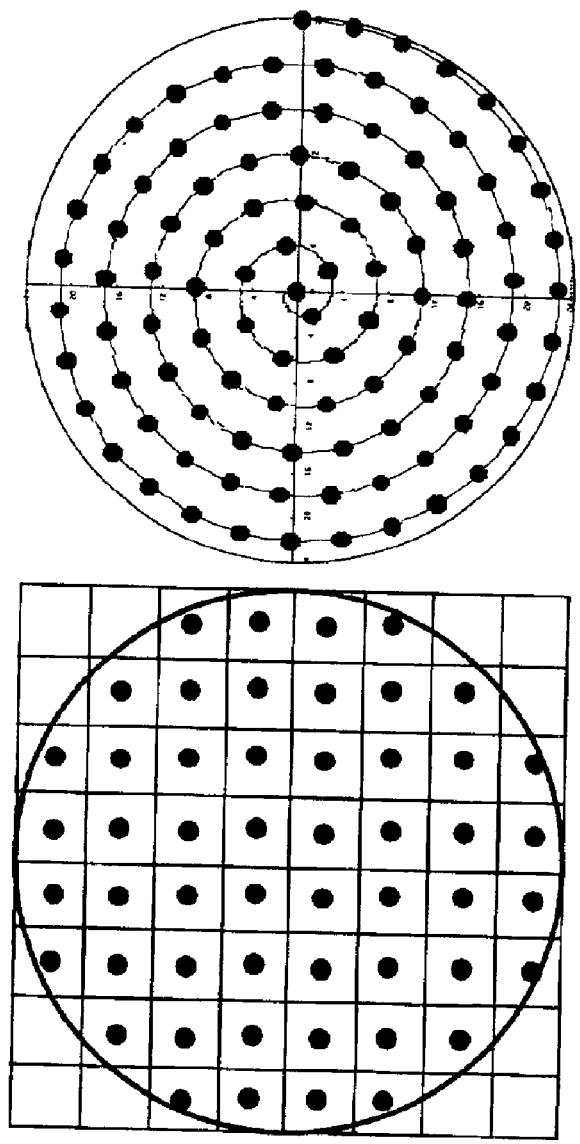
FIG. 9 shows an entrance pupil splitting method according to the present invention.

To obtain an accurate PSF, it is important that the entrance pupil is divided into many uniformly distributed small areas. There are two kinds of dividing methods: grid division and spiral division as shown in FIG. 9. Although grid division allows good uniformity to be obtained, it allows tracing of only about 70% of a predetermined number of rays because it has wasteful parts at its four corners. On the other hand, spiral division causes no wasteful ray tracing while maintaining uniformity. Spiral division is therefore adopted in the present embodiment. As described above, the PSF can be obtained by tracing many rays emitted from the object point and passing through points obtained by uniformly splitting the entrance pupil, and calculating the density of the spots on the retinal surface.

Although rays emitted from each object point and passing through each divided point of the entrance pupil must be traced to obtain the PSF with the method described above, the use of spline interpolation allows the position of the spots on the retina to be calculated with less calculation within a given error range, and, thus, the PSF, which is the density of spots on the surface of retina, can be obtained. When the distorted original image and the PSF obtained in accordance with the above method are convoluted, blur, which is found when external things are observed through a spectacle lens, can be accurately reflected. However, obtaining the PSF in accordance with the above method requires a long time for calculation and is not convenient for conducting a quantitative analysis of the imaging performance of a lens. A quantitative analysis can be easily conducted by approximating the PSF to a suitable type of function and using the parameters of the function for the calculation. A method for approximating the PSF with a two-dimensional normal distribution function will be described as follows.

In the following two dimensional normal distribution function:

Formula 12:

$$p(\mu, v) = \frac{1}{2\pi\sigma_\mu\sigma_v\sqrt{1-\rho^2}} \exp\left(-\frac{1}{2(1-\rho^2)}\left(\frac{\mu^2}{\sigma_\mu^2} - 2\rho\frac{\mu v}{\sigma_\mu\sigma_v} + \frac{v^2}{\sigma_v^2}\right)\right)$$

$\mu$ and $v$ represent the deviation in the vertical and horizontal directions, respectively, on the retina and $\sigma_\mu, \sigma_v$ and $\rho$ represent parameters of a normal distribution. These parameters satisfy the following relations:

$-1 < \rho < 1$ $\sigma_\mu > 0$ $\sigma_v > 0$

The locus of the point at which the exponent in the above equation has the value of $-\frac{1}{2}$ is an ellipse expressed by:

Formula 13:

$$\frac{\mu^2}{\sigma_\mu^2} + \frac{\nu^2}{\sigma_\nu^2} - \frac{2\rho\mu\nu}{\sigma_\mu\sigma_\nu} = 1 - \rho^2$$

The above ellipse can express the spreading range of the PSF. The ratio of the length of the major axis to the length of the minor axis and the direction of the major axis of the ellipse are closely related to the degree and the direction of astigmatism.

The method for obtaining the parameters of the two-dimensional normal distribution function from the ray data is selected to be a method in which statistical values of spots which are scattered on the image plane (each spot corresponding to each dividing point on the entrance pupil) are obtained and the obtained values are used as the parameters. Thus, the values can be obtained as follows:

Formula 14:

$$\sigma_{\mu 0} = \sqrt{\frac{1}{N}\sum_i \mu_i^2}$$

$$\sigma_{\nu 0} = \sqrt{\frac{1}{N}\sum_i \nu_i^2}$$

$$\rho = \frac{\frac{1}{N}\sum_i \mu_i \nu_i}{\sigma_i \sigma_i}$$

In the above formulae, N represents the number of rays and $(\mu_i, \nu_i)$ represents the coordinates of a spot.

When $\sigma_{\mu 0}, \sigma_{\nu 0}$ and $\rho$ are directly used as the parameters of the approximating normal distribution, there is the possibility that the result is different from the actual PSF depending on the condition of the distribution. In such as case, it is necessary that a suitable proportional constant k is selected and the parameters are adjusted as $\sigma_\mu = k\sigma_{\mu 0}$ and $\sigma_\nu = k\sigma_{\nu 0}$. As described above, the parameters of the two-dimensional normal distribution function approximating the PSF can be obtained by using the statistical values of ray spots on the retina.

It is occasionally convenient that the two-dimensional normal distribution function be expressed as a function of polar coordinates. By substituting $\mu = r\cos\theta$ and $\nu = r\sin\theta$ into the above equation and rearranging the resultant equation, the following equation can be obtained:

Formula 15:

$$p(r, \theta) = \frac{\sqrt{A^2 - B^2}}{2\pi}\exp\left(-\frac{r^2}{2}(A - B\cos(2\theta - 2\alpha))\right)$$

The parameters can be converted as follows:

Formula 16:

$$A = \frac{1}{2(1-\rho^2)}\left(\frac{1}{\sigma_\mu^2} + \frac{1}{\sigma_\nu^2}\right)$$

$$B = \frac{1}{2(1-\rho^2)}\sqrt{\left(\frac{1}{\sigma_\mu^2} - \frac{1}{\sigma_\nu^2}\right)^2 + \frac{4\rho^2}{\sigma_\mu^2\sigma_\nu^2}}$$

$$\tan 2\alpha = \frac{2\rho\sigma_\mu\sigma_\nu}{\sigma_\mu^2 - \sigma_\nu^2}$$

When the PSF is approximated with the two-dimensional normal distribution function and the parameters of the latter function are obtained as described above, although it is necessary to carry out ray tracing and statistical calculation to obtain the parameters of the two-dimensional normal distribution function for all object points, the amount of calculation can be reduced while the calculative error can be controlled within a certain range using spline interpolation.

d. Derivation of a Binocular PSF

The visual acuity with both eyes is generally said to be better than the visual acuity with a single eye. Therefore, the binocular PSF is expected to have a sharper shape than the right or left monocular PSF individually. In the present embodiment, uniting both right and left monocular PSFs in accordance with the following principles derives the binocular PSF:

1. When the monocular PSF for the right eye and the monocular PSF for the left eye are close to each other, the united PSF is of a distribution, which is more concentrated than each distribution of both monocular PSFs;

2. When the monocular PSF for the right eye and the monocular PSF for the left eye are different from each other to a great degree, the united PSF is of a distribution which is close to the most concentrated distribution between both monocular PSFs; and 3. Continuity and uniqueness of the united PSF are maintained.

As an example of the method for deriving the united binocular PSF from the right and left monocular PSF, the following method is proposed. PSF is approximated with a normal distribution function, which is represented by an ellipse:

Formula 17:

$$r^2 = \frac{1}{(A - B\cos(2\theta - 2\alpha))}$$

When the parameters of the ellipse representing the right monocular PSF are represented by $A_R, B_R$ and $\alpha_R$ and the parameters of the ellipse representing the left monocular PSF are represented by $A_L, B_L$ and $\alpha_L$, the parameters A, B and $\alpha$ of the ellipse representing the united binocular PSF can be obtained as shown in the following:

Formula 18:

$$\frac{1}{r^2} = \frac{1}{r_R^2} + \frac{1}{r_L^2}$$

$$= A_R + A_L - (B_R\cos(2\theta - 2\alpha_R) + B_L\cos(2\theta - 2\alpha_L))$$

$$= A - B\cos(2\theta - 2\alpha)$$

The above equation leads to the following relations:

Formula 19:

$$A = A_R + A_L$$

$$B = \sqrt{B_R^2 + B_L^2 + 2B_RB_L\cos 2(\alpha_R - \alpha_L)}$$

-continued $$\tan 2a = \frac{B_R \sin 2\alpha_R + B_L \sin 2\alpha_L}{B_R \cos 2\alpha_R + B_L \cos 2\alpha_L}$$

Figure 10:
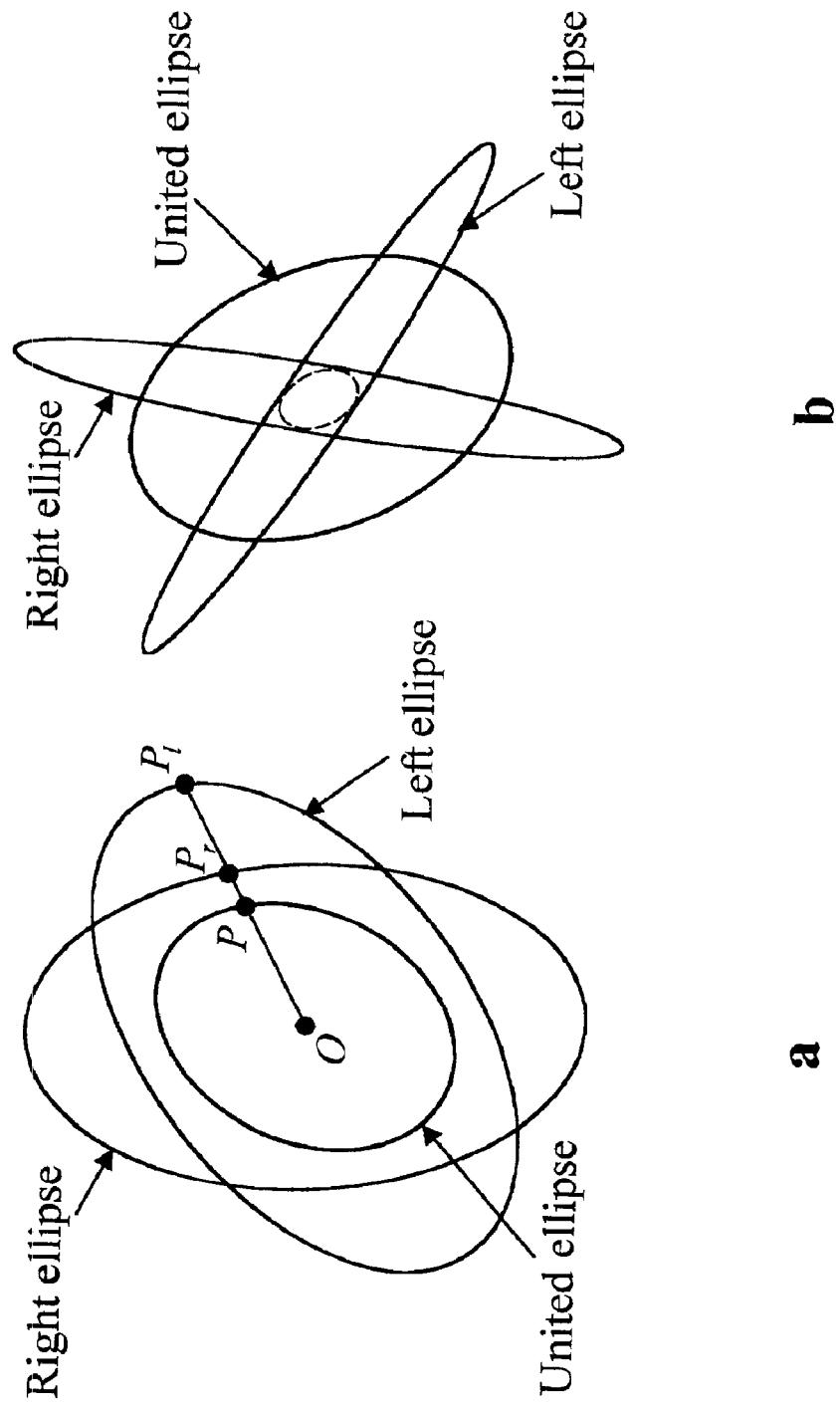
FIG. 10 shows a united binocular PSF according to the present invention.

FIG. 10a shows ellipses representing the right and left monocular PSF (the right and left ellipses, respectively) and an ellipse representing the united binocular PSF (the united ellipse). The above method is occasionally not applicable. In the case shown in FIG. 10b, both eyes have great astigmatisms and the directions are different, and the united binocular PSF distributes within an inadequately small area. Therefore, it is necessary to adjust the size of the united ellipse in accordance with the similarity of the right and left ellipses. For example, the adjustment is made by multiplying the area of the ellipse obtained above by a coefficient $$\kappa = \frac{2 S_C}{S_R + S_L},$$

wherein κ is the ratio of the area of a common portion $S_C$ of both right and left ellipse to the average of areas of both ellipses $$\frac{S_R + S_L}{2}.$$

The result of the adjustment can be expressed as:

Formula 20:

$$A = \kappa(A_R + A_L)$$
$$B = \kappa \sqrt{B_R^2 + B_L^2 + 2 B_R B_L \cos 2(\alpha_R - \alpha_L)}$$
$$\tan 2a = \frac{B_R \sin 2\alpha_R + B_L \sin 2\alpha_L}{B_R \cos 2\alpha_R + B_L \cos 2\alpha_L}$$

When the united binocular PSF is approximated with the two-dimensional normal distribution function and the parameters of the latter function are derived as described above, although it is necessary to derive parameters of each right and left monocular PSF and further the binocular PSF for all object points, the amount of calculation can be reduced while the calculation error is controlled within a certain range using spline interpolation.

(5) Convolution

In this step, convolution of the distorted original image which is created in the step of creating a distorted original image and the united binocular PSFs obtained in the step of obtaining PSF is conducted and a binocular synkinetic rotation-based retinal image is obtained. The binocular synkinetic rotation-based retinal image is an image of the virtual objects placed in the virtual three-dimensional space observed by the eyes at a specific position in a specific direction through specific positions on the spectacle lenses.

The convolution is conducted, for example, in the following manner. When the distribution of the optical intensity of the distorted original image is represented by $f(\mu,\nu)$ and PSF at a point $(\mu_0,\nu_0)$ is represented by $p(\mu_0,\nu_0, \mu-\mu_0, \nu-\nu_0)$, the optical intensity $g(\mu_0,\nu_0)$ at a point $(\mu_0,\nu_0)$ on the retina is expressed by the following equation:

Formula 21:

$$g(\mu_0, \nu_0) = \int\!\!\!\int_S f(\mu, \nu) p(\mu_0, \nu_0, \mu-\mu_0, \nu-\nu_0) d\mu d\nu$$

In the above equation, $p(\mu_0, \nu_0, \mu-\mu_0, \nu-\nu_0)$ represents the value of PSF at the point at a distance of $(\mu-\mu_0, \nu-\nu_0)$ from the point $(\mu_0,\nu_0)$. S represents the range of spreading of the PSF. By obtaining the optical intensity at all points on the binocular synkinetic rotation-based retinal image in accordance with the above equation, a still binocular synkinetic rotation-based retinal image can be obtained.

Figure 11:
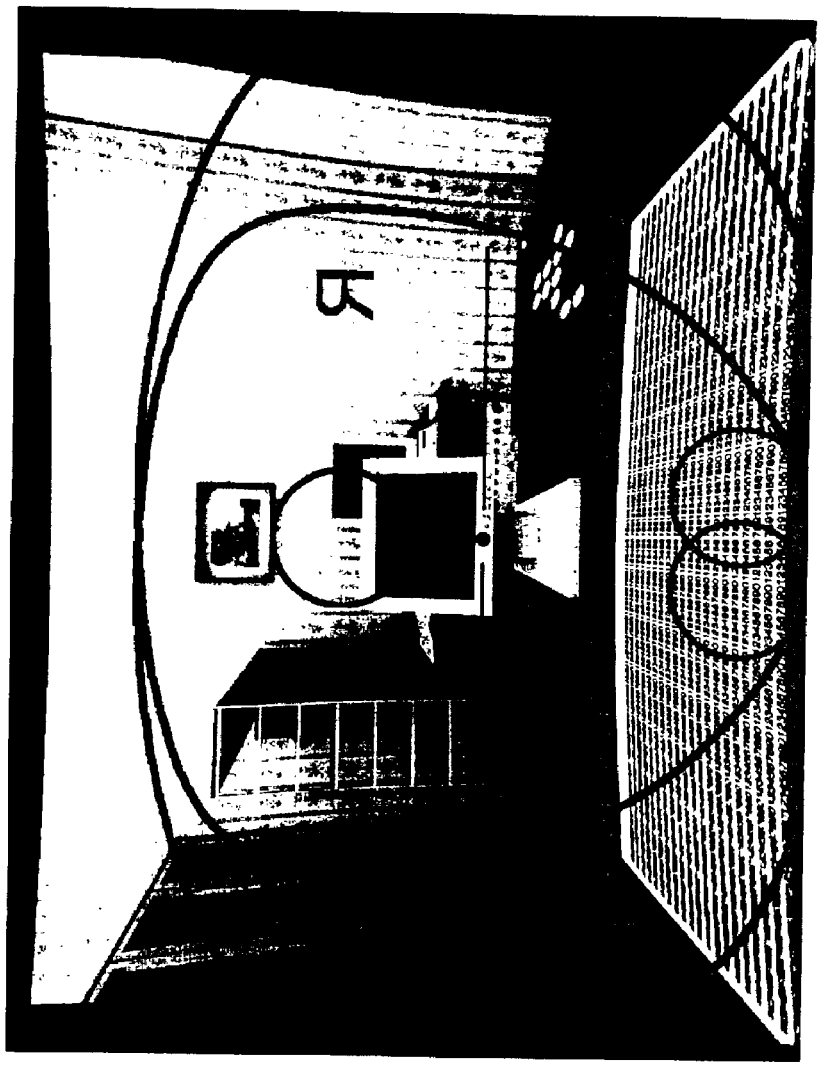
FIG. 11 shows a binocular synkinetic rotation-based retinal image of Embodiment 1 of the present invention.

FIG. 11 shows an example of the binocular synkinetic rotation-based retinal image obtained in accordance with the method of Embodiment 1. In FIG. 11, a binocular synkinetic rotation-based retinal image is shown as obtained by observing scenery in a room through progressive addition lenses of distant-vision power 0.00D with addition of 2.50 (HOYALUX SUMMIT, a trade name by HOYA Co. Ltd.) placed in front of each eye. The visual field is 102.5° in the horizontal direction and 86.2° in the vertical direction. The spectacle frame has a size of a height of 40 mm and a width of 50 mm. The datum lines on the frames and the rings for measuring the distant-vision refractive power and the refractive near-vision power are shown. In this example, the positions of the rings for measuring the distant-vision refractive power in the right and left lenses are placed at positions overlapping each other in the binocular synkinetic rotation-based retinal image. As the range of accommodation of the eye, 0.5D is used and the power of accommodation is set at the same value for both eyes.

In accordance with the method of the present embodiment, an image approximately reproducing blur and distortion perceived by observing objects through spectacle lenses such as progressive addition lenses, including the effect of binocular vision, is obtained. In other words, the entire visual field can be clearly perceived by the normal naked eyes and, on the other hand, some portions of the visual field are clearly seen and other portions of the visual field are seen with blur and distortion by presbyopic eyes having progressive addition lenses placed in front of them. In accordance with the method of the present embodiment, an image, which will be perceived by presbyopic eyes can be reproduced as a virtual image. Therefore, by displaying the obtained image on a display apparatus, a designer who does not have presbyopic eyes can confirm the perception obtained through a given pair of progressive addition lenses worn by a person with presbyopic eyes. Thus, a most desirable evaluation can be achieved. Moreover, since the perception can be confirmed before the progressive addition lenses are produced, freedom of customers in selecting lenses increases and mistakes in the manufacture of lenses can be decreased for spectacle shops.

B. Embodiment 2

Figure 12:
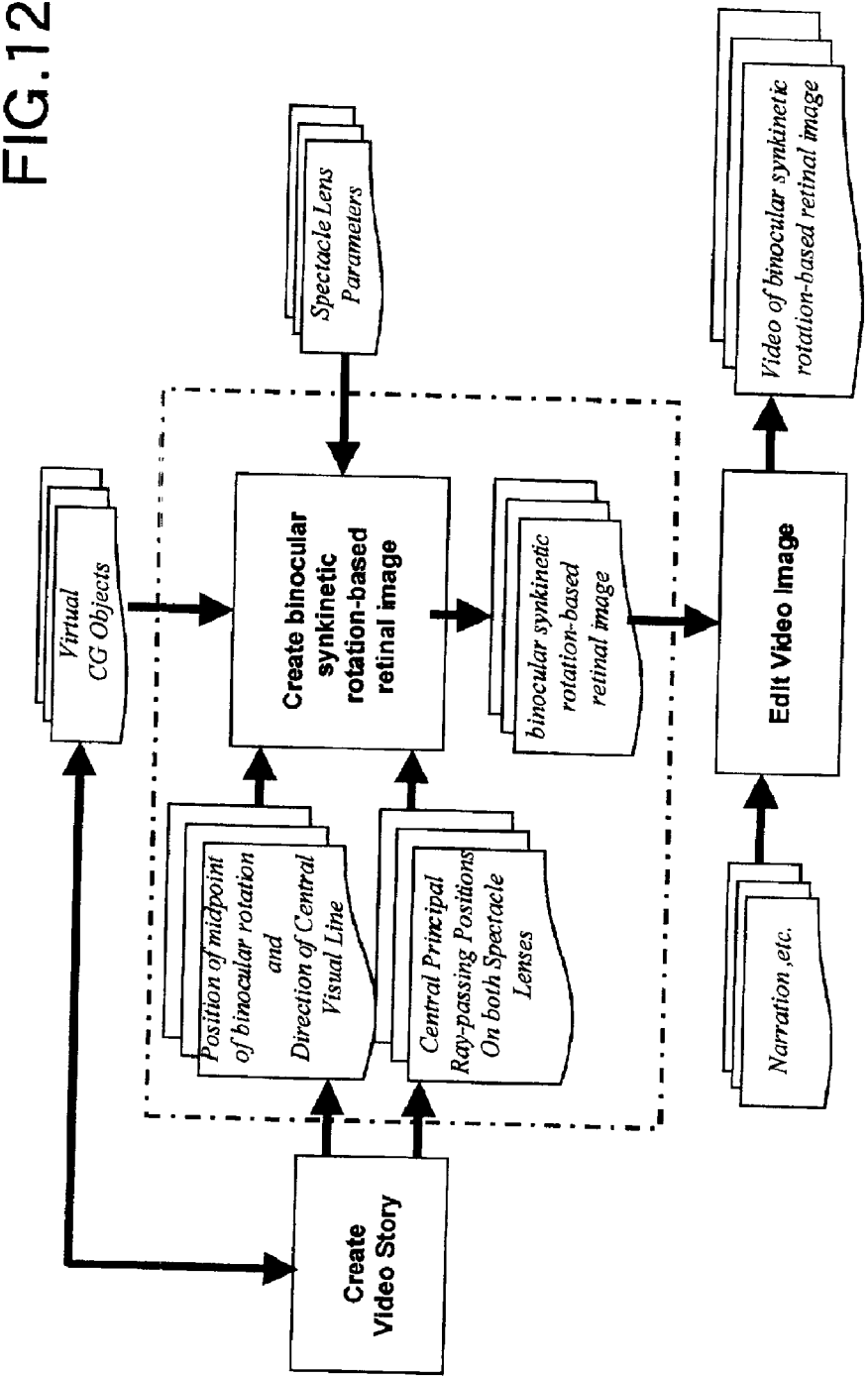
FIG. 12 shows creating a video image of a binocular synkinetic rotation-based retinal image

In the second embodiment, many still binocular synkinetic rotation-based retinal images such as those produced in Embodiment 1 are created at a plurality of points in time, while the position of the midpoint of binocular rotation, the direction of the central visual line, both principal ray-passing positions on spectacle lenses, the amount of deformation and displacement of the virtual objects are changed. Therefore, the method of the present embodiment is essentially similar to the method of Embodiment 1 except that the method further comprises: (1) creating a story of changes with time of the position of the midpoint of binocular rotation, the direction of the central visual line, both principal ray-passing positions on spectacle lenses, the amount of deformation and displacement of the virtual objects and (2) creating a video image by editing the still images at a plurality of points in time. FIG. 12 shows a diagram exhibiting the overall flow of the method. Detailed descriptions for each step are omitted for brevity, but may be understood by reference to the Embodiment 1. The method for creating the story can comprise smooth moving of the visual line achieved by using the spline interpolation method, not by deciding the position of the midpoint of binocular rotation, the direction of the central visual line, both principal ray-passing positions on spectacle lenses, the amount of deformation and displacement of the virtual objects individually at each point in time.

In accordance with the above method of Embodiment 2, a video image which reproduces fluctuation caused by change in the position of the eyes and movement of the visual lines in addition to blur and distortion perceived by observing through spectacle lenses such as progressive addition lenses, can be obtained. Therefore, when the obtained video image is displayed on a display apparatus, the evaluation can be achieved based on a vivid perception as if the designer were actually a person wearing such spectacle lenses. When frame marks are displayed on the video image displayed on the display apparatus, blur, distortion and fluctuation can be observed while displacement of the visual lines on both spectacle lenses is confirmed.

Figure 13:
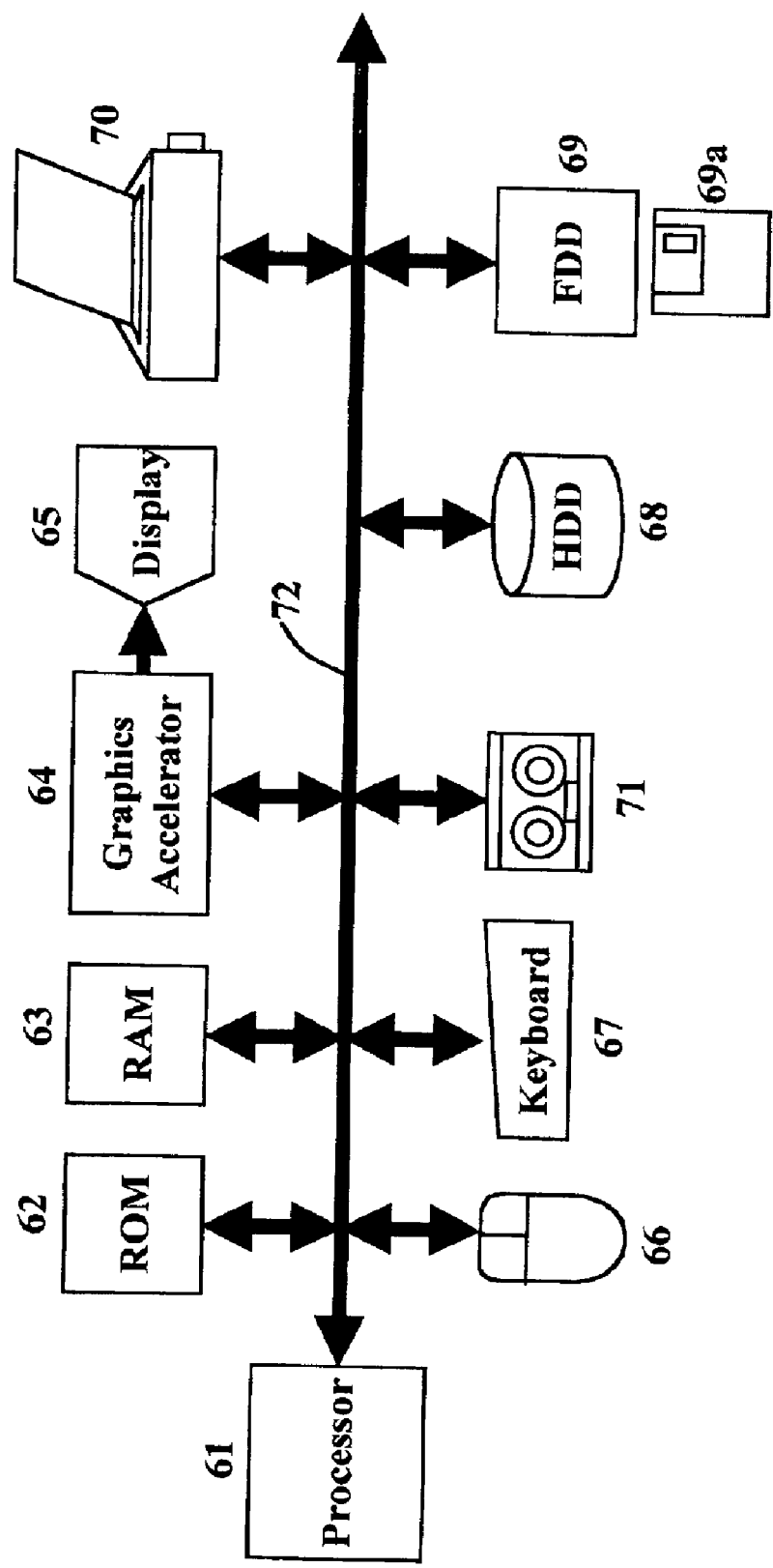
FIG. 13 shows the construction of the apparatus for simulating an ocular optical system of the present invention.

The apparatus for simulating in accordance with the methods described in the above Embodiments will be briefly described as follows. FIG. 13 shows a block diagram exhibiting the construction of the apparatus for simulating an ocular optical system of the present invention. As shown in FIG. 13, the apparatus comprises a processor 61, a read-only-memory (ROM) 62, a main memory 63, a graphic control circuit 64, a display apparatus 65, a mouse 66, a keyboard 67, a hard disk apparatus (HDD) 68, a floppy disk apparatus 69, a printer 70 and a magnetic tape apparatus 71. These elements are connected through a data bus 72.

The processor 61 is in charge of overall control of the entire apparatus. In the read-only-memory 62, programs necessary for starting up are contained. In the main memory 63, simulation programs used for conducting the simulation are contained. The graphic control circuit 64, which includes a video memory, converts data of an obtained image into signals for display and displays the image on the display apparatus 65. The mouse 66 is a pointing device for selecting icons and menus on the display apparatus. In the hard disk apparatus 68, system programs and simulation programs are stored and these programs are loaded to the main memory 63 after the electric power is supplied. Simulation data are also temporarily stored in the hard disk apparatus.

In the floppy disk apparatus 69, data necessary for simulation such as data of an original image are input into the memory or into the hard disk apparatus from a floppy disk 69A or, where necessary, saved into the floppy disk 69A. The magnetic tape apparatus 71 is used for saving simulation data into a magnetic tape, where necessary. As the apparatus having the above basic construction, a high performance personal computer or a general-purpose computer can be used.

The advantages of the present invention are summarized as follows. As described above in detail, the method for simulating an ocular optical system and the apparatus therefor has the following characteristics: an image perceived by the eyes through the spectacle lenses is used, which is not an image projected on the retinal surfaces of eyes, but a binocular synkinetic rotation-based retinal image created by computer simulation. The binocular synkinetic rotation-based retinal image is not an optical image projected on the retinal surfaces of eyes but an image created as follows: each of right and left eyeballs is rotated in a visual field in a manner such that an object point is caught at the fovea of the retina of each eyeball; a united binocular foveal image of the object point is created by uniting both images projected on the right and left fovea; and the binocular synkinetic rotation-based retinal image is created by connecting united binocular foveal images with respect to each object point of the original image. The above method comprises creating an original image comprising placing the midpoint of binocular rotation at a specific position and creating an original image as an image of the virtual objects within a specific pyramidal visual field; creating by ray tracing a distorted original image having distortion which is perceived by looking through spectacle lenses; obtaining positions of spectacle frames in the distorted original image; deriving point spread functions comprising deriving right and left monocular point spread functions from object points of the original image and deriving binocular point spread functions by uniting the right and left monocular point spread functions; convoluting the distorted original image and the binocular point spread functions with respect to each object point, each object point representing a pixel of the original image; and further, creating a video image of the binocular synkinetic rotation-based retinal image by editing the binocular synkinetic rotation-based retinal images for a plurality of points in time. As described above, the method and the apparatus enable simulating visual perception having blur and distortion, including the effect of using both eyes, in observing an object through spectacle lenses such as progressive addition lenses.

While the present invention has been described in terms of certain preferred embodiments, one of ordinary skill in the art will recognize that additions, deletions, substitutions, modifications and improvements can be made will remaining within the scope and spirit of the present invention as determined by the appended claims.

What is claimed is:

1. A method for simulating an ocular optical system comprising simulating objects as seen by an observer through spectacle lenses placed in front of right and left eyes, the method comprising the steps of:

creating a binocular foveal image with respect to a plurality of object points in a visual field by computer simulation, wherein the binocular foveal image is an image produced by uniting images projected on each fovea of the right and left retinas of the right and left eyes when each of the right and left eyes is rotated in a manner such that an object point in the visual field is caught at the fovea of each of the right and left retinas; and simulating the perception of object points in the visual field as actually seen by an observer through spectacle lenses placed in front of each of the right and left eyes using the binocular foveal image.

2. A method for simulating an ocular optical system according to claim 1, further comprising the step of displaying the binocular foveal image on a display apparatus.

3. A method for simulating an ocular optical system comprising simulating objects as seen by an observer through spectacle lenses placed in front of right and left eyes, the method comprising the steps of:

creating a binocular synkinetic rotation-based retinal image by computer simulation; and simulating the perception of object points in the visual field as actually seen by an observer through spectacle lenses placed in front of each of the right and left eyes using the binocular synkinetic rotation-based retinal image.

4. A method for simulating an ocular optical system according to claim 3, further comprising the step of displaying the binocular synkinetic rotation-based retinal image on a display apparatus.

5. A method for simulating an ocular optical system according to claim 3, wherein the step of creating a binocular synkinetic rotation-based retinal image further comprises the steps of:

creating an original image comprising placing a midpoint of binocular rotation at a specific position, the midpoint of binocular rotation being a midpoint between centers of monocular rotation of right and left eyes, and creating, as the original image, an image within a visual field defined as a specific pyramidal field having an apex at the midpoint of binocular rotation;

creating a distorted original image by a ray tracing method, wherein the distorted original image is an image having distortion obtained by observing object points in the visual field through the spectacle lenses;

deriving point spread functions, comprising providing left and right composite optical systems each comprising a spectacle lens and an ocular optical system, obtaining right and left monocular point spread functions from light emitted from each object point, and deriving a binocular point spread function by uniting the right and left monocular point spread functions; and convoluting the distorted original image created in the step of creating a distorted original image and the binocular point spread functions derived in the step of point spread functions with respect to each object point of the original image.

6. A method for simulating an ocular optical system according to claim 3, wherein the binocular synkinetic rotation-based retinal image is created by a method comprising the steps of:

(a) creating an original image, further comprising the steps of:
(i) creating virtual objects by using computer graphics and placing the virtual objects in a virtual three-dimensional space;
(ii) placing a midpoint of binocular rotation at a specific position in the virtual three-dimensional space;
(iii) creating an original image of the virtual objects within a visual field, the visual field defined as a pyramid whose apex is located at the midpoint of binocular rotation and whose central axis is along a direction of a specific central visual line; and
(iv) obtaining, with respect to a plurality of object points, each object point corresponding to a pixel of the original image, an object distance, the object distance being defined as a distance between the object point and the midpoint of binocular rotation;

(b) creating a distorted original image, further comprising the steps of:
(i) defining, for viewing an object point, a direction of synkinetic binocular rotation, which is uniquely determined, by both directions of rotation of right and left eyeballs toward the object point;
(ii) obtaining a central direction of synkinetic binocular rotation with a ray tracing method so that each of right and left monocular central principal rays passe through a specific position on each spectacle lens, respectively, wherein the central direction of synkinetic binocular rotation is the direction of synkinetic binocular rotation for viewing the object point located at a center of the visual field and the right and left monocular central principal rays are principal rays directed from right and left eyeballs, respectively, toward the central object point;
(iii) obtaining, with respect to each object point, a direction of synkinetic binocular rotation for viewing the object point as the position of the object point in an after-lens visual field with a ray tracing method, wherein the after-lens visual field is a visual field whose central axis is along the central direction of synkinetic binocular rotation;
(iv) creating a distorted original image, the distorted original image being defined as an image obtained in the after-lens visual field and having distortion caused by the spectacle lenses; and
(v) obtaining, with respect to each object point, both right and left principal ray-passing positions, wherein the principal ray-passing position is a position on the spectacle lens through which a principal ray toward the object point passes;

(c) obtaining positions of spectacle frames by creating images of spectacle frame marks that indicate positions of right and left spectacle frames on the original image or on the distorted original image by using data of the principal ray-passing positions obtained in the step of creating a distorted original image;

(d) deriving point spread functions, further comprising the steps of:
(i) providing an accommodation-dependent ocular optical system for each of the right and left eyes as a model of the ocular optical system;
(ii) calculating, with respect to each object point, distances from the object point to the right and left centers of monocular rotation using the object distance obtained in the step of creating an original image;
(iii) setting, with respect to each object point, powers of accommodation of right and left eyes to a same value or different values in accordance with each distance from the object point to each center of monocular rotation, and each refractive power of spectacle lens at each principal ray-passing position obtained in the step of creating a distorted original image;
(iv) deriving, with respect to each object point, a monocular point spread function for each of the right and left eyes in a composite optical system comprising the spectacle lens and the accommodation-dependent ocular optical system which is rotated in accordance with a direction of monocular rotation; and
(v) deriving, with respect to each object point, a binocular point spread function by uniting both right and left monocular point spread functions obtained in step (c) (iv); and (e) convoluting, further comprising the steps of:
(i) convoluting the distorted original image and the binocular point spread functions of each object point to create a binocular synkinetic rotation-based retinal image; and
(ii) where necessary, overlaying images of both right and left spectacle frame marks created in the step of obtaining positions of spectacle frames on the binocular synkinetic rotation-based retinal image.

7. A method for simulating an ocular optical system comprising simulating objects as actually seen by an observer through spectacle lenses placed in front of right and left eyes comprising the steps of:
  creating virtual objects by using computer graphics and placing them in a virtual three-dimensional space;
  creating a story, of for a plurality of points in time, of a position of a midpoint of binocular rotation, direction of the central visual line, principal ray-passing positions on each spectacle lens, an amount of deformation and displacement of the virtual objects;
  creating a binocular synkinetic rotation-based retinal image at each point of time using the method for simulating an ocular optical system according to any one of claims 5 and 6; and
  creating a video image of the binocular synkinetic rotation-based retinal image by editing the binocular synkinetic rotation-based retinal images for said plurality of points in time.

8. A method for simulating an ocular optical system according to any one of claims 5 and 6, wherein, in said step of creating a distorted original image, the definition of the direction of synkinetic binocular rotation satisfies following principles:
  a single unique direction of synkinetic binocular rotation is determined by directions of right and left monocular rotations;
  the direction of synkinetic binocular rotation continuously changes with changes in directions of right and left monocular rotation; and
  the direction of synkinetic binocular rotation approximates the direction of right and left monocular rotation.

9. A method for simulating an ocular optical system according to any of claims 5 and 6, wherein, in the step of creating a distorted original image, the direction of synkinetic binocular rotation is defined as follows:
Formula 1:

$$\bar{r} = \frac{k\bar{r}_R + (1-k)\bar{r}_L}{|k\bar{r}_R + (1-k)\bar{r}_L|}$$

wherein $\bar{r}$ represents a unit vector in the direction of synkinetic binocular rotation, $\bar{r}_R$ and $\bar{r}_L$ represent unit vectors in the directions of right and left monocular rotations, respectively, in Descartes coordinates and $0<k<1$.

10. A method for simulating an ocular optical system according to any one of claims 5 and 6, wherein, in said step of deriving point spread functions, a binocular point spread function is derived by uniting both right and left monocular point spread functions for viewing an object point representing each pixel in the original image in accordance with following principles:
  when the monocular point spread function for the right eye and the monocular point spread function for the left eye are close to each other, the united point spread function is of a distribution more concentrated than each monocular point spread function;
  when the monocular point spread function for the right eye and the monocular point spread function for the left eye are different from each other beyond a certain degree, the united point spread function is a distribution close to the most concentrated distribution of the monocular point spread functions; and
  continuity and uniqueness of the united point spread functions are maintained.

11. A method for simulating an ocular optical system according to any one of claims 5 and 6, wherein, in the step of deriving the point spread functions, both right and left monocular point spread functions for viewing an object point are derived using a same method; each derived monocular point spread function is optimally approximated with a two-dimensional normal distribution function using a same method; and parameters of a two-dimensional normal distribution function approximating the binocular point spread function made by uniting both monocular point spread functions are obtained from parameters of the two-dimensional normal distribution functions approximating the both right and left monocular point spread functions according to the method:

In polar coordinates, when the monocular PSF for the right eye is expressed as:
Formula 2:

$$p_R(r, \theta) = \frac{\sqrt{A_R^2 - B_R^2}}{2\pi} \exp\left(-\frac{r^2}{2}(A_R - B_R\cos(2\theta - 2\alpha_R))\right)$$

and the monocular PSF for the left eye is expressed as:

$$p_L(r, \theta) = \frac{\sqrt{A_L^2 - B_L^2}}{2\pi} \exp\left(-\frac{r^2}{2}(A_L - B_L\cos(2\theta - 2\alpha_L))\right),$$

then the binocular PSF united by both monocular PSFs is expressed as:

$$p(r, \theta) = \frac{\sqrt{A^2 - B^2}}{2\pi} \exp\left(-\frac{r^2}{2}(A - B\cos(2\theta - 2\alpha))\right),$$

where parameters A, B, α of the united binocular PSF are expressed as:

$$A = \kappa(A_R + A_L)$$

$$B = \kappa\sqrt{B_R^2 + B_L^2 + 2B_R B_L \cos 2(\alpha_R - \alpha_L)}$$

$$\tan 2\alpha = \frac{B_R \sin 2\alpha_R + B_L \sin 2\alpha_L}{B_R \cos 2\alpha_R + B_L \cos 2\alpha_L},$$

wherein κ is expressed as:

$$\kappa = \frac{2S_C}{S_R + S_L},$$

wherein $S_R$ is the area of the ellipse $$r^2(A_R - B_R \cos(2\theta - 2\alpha_R)) = 1$$

which represents the distributive area of right monocular PSF and $S_L$ is the area the ellipse $$r^2(A_L - B_L \cos(2\theta - 2\alpha_L)) = 1$$

which represents the distributive area of left monocular PSF and $S_C$ is the area of the common portion of the both ellipses and κ is the ratio of $S_C$ to the average area $$\frac{S_R + S_L}{2}.$$

12. An apparatus for simulating an ocular optical system comprising simulating objects as seen by an observer through spectacle lenses placed in front of right and left eyes, comprising:
  means for creating a binocular synkinetic rotation-based retinal image by computer simulation; and
  means for simulating the perception of object points in the visual field as actually seen by an observer through spectacle lenses placed in front of each of the right and left eyes using the binocular synkinetic rotation-based retinal image.

13. A apparatus for simulating an ocular optical system according to claim 12, further comprising a display for displaying the binocular synkinetic rotation-based retinal image.

14. An apparatus for simulating an ocular optical system according to claim 12, wherein the means for creating a binocular synkinetic rotation-based retinal image further comprises:
  means for creating an original image comprising placing a midpoint of binocular rotation at a specific position, the midpoint of binocular rotation being a midpoint between centers of monocular rotation of right and left eyes, and creating, as the original image, an image within a visual field defined as a specific pyramidal field having an apex at the midpoint of binocular rotation;
  means for creating a distorted original image by a ray tracing method, wherein the distorted original image is an image having distortion obtained by observing object points in the visual field through the spectacle lenses;
  means for deriving point spread functions, comprising providing left and right composite optical systems each comprising a spectacle lens and an ocular optical system, obtaining right and left monocular point spread functions from light emitted from each object point, and deriving a binocular point spread function by uniting the right and left monocular point spread functions; and
  means for convoluting the distorted original image created in the step of creating a distorted original image and the binocular point spread functions derived in the step of point spread functions with respect to each object point of the original image.

15. A method for simulating an ocular optical system according to claim 12, wherein the means for creating a binocular synkinetic rotation-based retinal image further comprises:
  (a) means for creating an original image, further comprising:
    (i) means for creating virtual objects by using computer graphics and placing the virtual objects in a virtual three-dimensional space;
    (ii) means for placing a midpoint of binocular rotation at a specific position in the virtual three-dimensional space;
    (iii) means for creating an original image of the virtual objects within a visual field, the visual field defined as a pyramid whose apex is located at the midpoint of binocular rotation and whose central axis is along a direction of a specific central visual line; and
    (iv) means for obtaining, with respect to a plurality of object points, each object point corresponding to a pixel of the original image, an object distance, the object distance being defined as a distance between the object point and the midpoint of binocular rotation;
  (b) means for creating a distorted original image, further comprising:
    (i) means for defining, for viewing an object point, a direction of synkinetic binocular rotation, which is uniquely determined, by both directions of rotation of right and left eyeballs toward the object point;
    (ii) means for obtaining a central direction of synkinetic binocular rotation with a ray tracing method so that each of right and left monocular central principal rays passes through a specific position on each spectacle lens, respectively, wherein the central direction of synkinetic binocular rotation is the direction of synkinetic binocular rotation for viewing the object point located at a center of the visual field and the right and left monocular central principal rays are principal rays directed from right and left eyeballs, respectively, toward the central object point;
    (iii) means for obtaining, with respect to each object point, a direction of synkinetic binocular rotation for viewing the object point as the position of the object point in an after-lens visual field with a ray tracing method, wherein the after-lens visual field is a visual field whose central axis is along the central direction of synkinetic binocular rotation;
    (iv) means for creating a distorted original image, the distorted original image being defined as an image obtained in the after-lens visual field and having distortion caused by the spectacle lenses; and
    (v) means for obtaining, with respect to each object point, both right and left principal ray-passing positions, wherein the principal ray-passing position is a position on the spectacle lens through which a principal ray toward the object point passes;
  (c) means for obtaining positions of spectacle frames by creating images of spectacle frame marks that indicate positions of right and left spectacle frames on the original image or on the distorted original image by using data of the principal ray-passing positions obtained in the step of creating a distorted original image;
  (d) means for deriving point spread functions, further comprising:
    (i) means for providing an accommodation-dependent ocular optical system for each of the right and left eyes as a model of the ocular optical system;
    (ii) means for calculating, with respect to each object point, distances from the object point to the right and left centers of monocular rotation using the object distance obtained in the step of creating an original image;
    (iii) means for setting, with respect to each object point, powers of accommodation of right and left eyes to a same value or different values in accordance with each distance from the object point to each center of monocular rotation, and each refractive power of spectacle lens at each principal ray-passing position obtained in the step of creating a distorted original image;
    (iv) means for deriving, with respect to each object point, a monocular point spread function for each of the right and left eyes in a composite optical system comprising the spectacle lens and the accommodation-dependent ocular optical system which is rotated in accordance with a direction of monocular rotation; and
    (v) means for deriving, with respect to each object point, a binocular point spread function by uniting both right and left monocular point spread functions obtained in step (c) (iv); and
(e) means for convoluting, further comprising:
(i) means for convoluting the distorted original image and the binocular point spread functions of each object point to create a binocular synkinetic rotation-based retinal image; and
(ii) where necessary, means for overlaying images of both right and left spectacle frame marks created in the step of obtaining positions of spectacle frames on the binocular synkinetic rotation-based retinal image.

16. An apparatus for an ocular optical system according to any of claims 14 and 15, wherein, in the means for creating a distorted original image, the direction of synkinetic binocular rotation is defined as follows:
Formula 1:

$$\bar{r} = \frac{k\bar{r}_R + (1-k)\bar{r}_L}{|k\bar{r}_R + (1-k)\bar{r}_L|}$$

wherein $\bar{r}$ represents a unit vector in the direction of synkinetic binocular rotation, $\bar{r}_R$ and $\bar{r}_L$ represent unit vectors in the directions of right and left monocular rotations, respectively, in Descartes coordinates and $0<k<1$.

17. An apparatus for simulating an ocular optical system according to any one of claims 14 and 15, wherein, in the means for deriving the point spread functions, both right and left monocular point spread functions for viewing an object point are derived using a same method; each derived monocular point spread function is optimally approximated with a two-dimensional normal distribution function using a same method; and parameters of a two-dimensional normal distribution function approximating the binocular point spread function made by uniting both monocular point spread functions are obtained from parameters of the two-dimensional normal distribution functions approximating the both right and left monocular point spread functions according to the method:

In polar coordinates, when the monocular PSF for the right eye is expressed as:
Formula 2:

$$p_R(r, \theta) = \frac{\sqrt{A_R^2 - B_R^2}}{2\pi} \exp\left(-\frac{r^2}{2}(A_R - B_R\cos(2\theta - 2\alpha_R))\right)$$

and the monocular PSF for the left eye is expressed as:

$$p_L(r, \theta) = \frac{\sqrt{A_L^2 - B_L^2}}{2\pi} \exp\left(-\frac{r^2}{2}(A_L - B_L\cos(2\theta - 2\alpha_L))\right),$$

then the binocular PSF united by both monocular PSFs is expressed as:

$$p(r, \theta) = \frac{\sqrt{A^2 - B^2}}{2\pi} \exp\left(-\frac{r^2}{2}(A - B\cos(2\theta - 2\alpha))\right),$$

where parameters $A, B, \alpha$ of the united binocular PSF are expressed as:

$$A = \kappa(A_R + A_L)$$
$$B = \kappa\sqrt{B_R^2 + B_L^2 + 2B_R B_L \cos2(\alpha_R - \alpha_L)}$$
$$\tan2\alpha = \frac{B_R\sin2\alpha_R + B_L\sin2\alpha_L}{B_R\cos2\alpha_R + B_L\cos2\alpha_L},$$

wherein $\kappa$ is expressed as:

$$\kappa = \frac{2S_C}{S_R + S_L},$$

wherein $S_R$ is the area of the ellipse $$r^2(A_R - B_R \cos(2\theta - 2\alpha_R)) = 1$$

which represents the distributive area of right monocular PSF and $S_L$ is the area the ellipse $$r^2(A_L - B_L \cos(2\theta - 2\alpha_L)) = 1$$

which represents the distributive area of left monocular PSF and $S_C$ is the area of the common portion of the both ellipses and $\kappa$ is the ratio of $S_C$ to the average area $$\frac{S_R + S_L}{2}.$$

* * * * *